United States Patent
Oghafua et al.

(10) Patent No.: US 7,619,188 B2
(45) Date of Patent: Nov. 17, 2009

(54) APPARATUS AND METHOD FOR COOKING DEHYDRATED POWDERED FOOD

(75) Inventors: Gregson O. Oghafua, Heath, TX (US); Lars D. Jensen, Arlington, TX (US); Darrel G. Walker, Richardson, TX (US)

(73) Assignee: Bendall Innovations, Inc., Heath, TX (US)

( * ) Notice: Subject to any disclaimer, the term of this patent is extended or adjusted under 35 U.S.C. 154(b) by 640 days.

(21) Appl. No.: 11/130,420

(22) Filed: May 17, 2005

(65) Prior Publication Data

US 2006/0263501 A1   Nov. 23, 2006

(51) Int. Cl.
*H05B 6/12* (2006.01)
*H47J 37/12* (2006.01)

(52) U.S. Cl. .......................... 219/620; 219/600; 99/325

(58) Field of Classification Search ................. 219/620, 219/600, 621, 622, 623, 624, 625, 626, 627; 99/325, 324–339
See application file for complete search history.

(56) References Cited

U.S. PATENT DOCUMENTS

| | | | |
|---|---|---|---|
| 3,790,735 A * | 2/1974 | Peters, Jr. .................... | 219/622 |
| 3,807,292 A | 4/1974 | Cinger | |
| 3,815,491 A | 6/1974 | Guyer | |
| 3,884,135 A | 5/1975 | Löhr et al. | |
| 4,048,473 A | 9/1977 | Burkhart | |
| 4,392,418 A | 7/1983 | Jimenez | |
| 4,540,588 A | 9/1985 | Bartfield | |
| 4,649,810 A * | 3/1987 | Wong ........................... | 99/326 |
| 5,205,206 A | 4/1993 | Kitama et al. | |
| 5,233,916 A | 8/1993 | Butler et al. | |
| 5,279,213 A | 1/1994 | Miyahara | |
| 5,615,951 A | 4/1997 | Gabriele | |
| 5,881,632 A | 3/1999 | Fadoul | |
| 5,934,582 A | 8/1999 | Abledu | |
| 6,042,034 A | 3/2000 | Abledu | |
| 6,360,652 B1 | 3/2002 | Cusenza et al. | |

(Continued)

FOREIGN PATENT DOCUMENTS

AP             226         12/1992

(Continued)

OTHER PUBLICATIONS

Zojirushi Induction Rice Cooker, Model NH-VBC, www.appliancemagazine.com, May 2004.

(Continued)

*Primary Examiner*—Daniel L Robinson

(57) ABSTRACT

An apparatus and method for cooking in heated water any dehydrated powdered food, including West African yams, garri and rice known collectively as fufu flour, beef, poultry, seafood, carrots, fruit, and any combination thereof, forming a product having varying degrees of thickness and hence varying cooking requirements, requiring correspondingly varying schedules for heating, dispensing, rehydrating and cooling. The apparatus is controlled by a microprocessor, either manually programmed or preprogrammed, for cooking various dehydrated powdered products according to a schedule particular to each at a push of a button. The apparatus has a heater for rapid heating, a dispenser which holds and dispenses the product into a cooking container, and a fan for rapid cooling if required by a cooking schedule. The apparatus benefits from a novel rehydration process that rapidly mixes water with the product to facilitate cooking such food almost instantly.

29 Claims, 17 Drawing Sheets

U.S. PATENT DOCUMENTS

| | | | |
|---|---|---|---|
| 6,375,102 B1 | 4/2002 | Bouleau et al. | |
| 6,384,387 B1 * | 5/2002 | Owens et al. | 219/601 |
| 6,516,708 B2 | 2/2003 | Cusenza et al. | |
| 6,550,372 B1 | 4/2003 | Sharples | |
| 6,616,324 B1 | 9/2003 | Planca et al. | |
| 6,629,491 B1 | 10/2003 | Chan | |
| 6,640,692 B1 | 11/2003 | Hilgers et al. | |
| 6,640,697 B2 | 11/2003 | Pavlovic et al. | |
| 6,640,698 B2 | 11/2003 | Pavlovic et al. | |
| 6,933,481 B2 * | 8/2005 | Greenburg | 219/679 |
| 2005/0105399 A1 * | 5/2005 | Strumpf et al. | 368/47 |
| 2006/0016804 A1 * | 1/2006 | Greenburg | 219/679 |

FOREIGN PATENT DOCUMENTS

| | | |
|---|---|---|
| AP | 571 | 12/1996 |
| EP | 0312651 | 4/1989 |
| GB | 1228167 | 4/1971 |

OTHER PUBLICATIONS

Westinghouse Mash'N Steam—WST3004, www.target.com.
Westinghouse Mash'N Steam—WST3004, www.target.com, May 18, 2005.

* cited by examiner

APPARATUS AND METHOD FOR COOKING DEHYDRATED POWDERED FOOD

BACKGROUND

I. Technical Field

The present invention relates to an apparatus and method for rapidly cooking in heated water any dehydrated powdered food, particularly the West African staples yam fufu, garri fufu and rice fufu, each having varying degrees of thickness which require correspondingly varying schedules for heating, dispensing, rehydrating, and cooling.

II. Background Art

Fufu pounding machines and mashers have been around for years. The present invention is not a food processor for pounding or mashing cooked yams, cassava or any fufu precursor. The present invention is an automatic cooking machine and method of cooking dehydrated powdered food. Other nonanalogous background art teach several machines that automatically cook various foods as small as unpulverized rice and grains in heated water, but none disclose the cooking of dehydrated powdered foods like Western and Central African fufu, Eastern African Ugali, Southern African Sadza, Japanese mochi, and the like, attendant with the special structure, process and function required of such a machine to hydrate and cook food having such different textures and thicknesses.

Boiling cereal grains to prepare dumplings or porridges is a process older than baking bread, dating back to Neolithic times before the advent of agriculture. The Greeks made maza and sitos, and the Romans made puls. Even today such foods continue to be prepared throughout the world, such as oatmeal in Scotland, polenta in Italy, tsampa in Tibet and grits in the United States. The African porridge is fufu, and over one billion people throughout the world, or approximately twenty percent of the world's population including the United States, consume some form of fufu on a daily basis. Fufu and eba (garri) comprise approximately up to fifty percent of the entire Nigerian and West African diet. The United States has approximately up to one million Nigerians and tens of millions from other parts of Africa and Southeast Asia.

This centuries old necessity of diligently pounding boiled cassava, plantains, yams, cocoyams, rice, and the like from a raw state to a form ready for cooking and mashing, led in 1987 to a breakthrough invention by Edward Ofari, a food science researcher and native of Ghana. The invention is now commonly known as fufu flour, a dehydrated powdered food that is much more easy to prepare. However, even with this advance in food technology, many West Africans, including inhabitants of remote parts of Nigeria and Ghana, continue to employ the traditional manual methods of preparing fufu. In the United States, and in a notable few areas abroad, people use the dehydrated flour, but continue to suffer an elaborate, labor intensive effort to cook the flour on a daily basis.

Definitions

| Term | Definition |
| --- | --- |
| banku - | fufu-like staple of Western Africa, popular in Ghana, made from ground corn (maize). Sometimes combined with grated cassava tuber. |
| beef - | Dehydrated powdered products from any food family including beef, and the like, are each considered to be a dehydrated powdered product. |
| cassava - | any of several plants (genus *Manihot*) of the spurge family grown in the tropics for their fleshy edible rootstocks which yield a nutritious starch. |
| carrot - | a biennial herb (*Daucus carota* of the Umbelliferae family). Dehydrated powdered carrots, and the like, are considered to be a dehydrated powdered product. |
| dehydrated powdered product - | The terms "dehydrated powdered product" and "dehydrated powdered food" are equivalent and used interchangeably herein. The product comprises any food that is both dehydrated and powdered including spices, poultry, seafood, and any of the various types of fufu referred to generically as fufu flour herein, dehydrated powdered carrots, beef, potatoes, cassava yams, eba (garri), rice, including any type of fruits, vegetables, beans, seads, vegetables, meats, and any combination thereof. |
| eba - | processed garri |
| mochi - | Japanese term for powdered or pounded rice |
| fufu - | processed cassava and used herein as a generic term for yams, cocoyams, garri, eba, plantains, mochi, and the like. Fufu flour therefore is a generic term that can be used for any and all dehydrated powdered foods either now invented or to be developed in the future including but not limited to oatmeal from Scotland, polenta from Italy, tsampa from Tibet and grits from the United States. |
| garri - | fried powdered cassava flour |
| kenkey - | fufu-like staple of Western Africa, popular in Ghana, made from ground corn (maize) |
| potato - | an erect American herb (*Solanum tuberosum*) of the nightshade family cultivated as a vegetable crop. Instant mashed potatoes, and the like, are considered to be a dehydrated powdered product. |
| Sadza - | fufu made from ground corn (maize) |
| Ugali - | fufu made from ground corn (maize) |
| yam - | the edible starchy tuberous root of various plants (genus *Dioscorea* of the family Dioscoreaceae used as a staple food in tropical areas. |

Fufu, otherwise spelled fu fu, foo-foo, foofoo, foufou, foutou or foo foo, is usually cooked by dissolving the raw fufu flour in heated water in a pot over an open fire. Then the mixture is stirred continuously for an extended period of time, varying anywhere from ten minutes to an hour depending on serving size. For best results, two people are required to cook fufu flour, one to hold the pot while the other vigorously stirs with a strong implement such as a thick wooden spoon. The sticky, paste mixture becomes very thick and increasingly difficult to stir. The time, energy and work required to stir out all the lumps in the boiled fufu is noteworthy. Afterward the uniform mixture is sometimes dumped into a wet container and shaken for an extended period of time until it forms itself into a smooth ball. Garri is made by the same process as yam fufu and is indeed also referred to generically as "garri fufu", but instead of immediate stirring in boiled water, it soaks for ten to thirty minutes in hot water depending on serving size.

Other Western African versions of fufu like banku and kenkey involve letting corn, or a cassava and corn mixture, ferment before cooking. The resulting liquid is placed in a pot and heated while stirring continuously with a large wooden spoon to keep lumps from forming as the liquid thickens. When the fufu is finally cooked, it becomes a sticky semi-solid, which is shaped into balls before serving as a starchy accompaniment for stews, soups or sauces.

There has been a long, deeply felt and unmet need, ever since the invention of fufu flour eighteen years ago, for an apparatus and method dedicated to the special cooking requirements of the various kinds of dehydrated powdered foods, particularly for yam, garri and rice fufu. Unlike dehydrated or instant mashed potato flakes, dehydrated powdered foods like fufu have thicker compositions and require longer and varying schedules for boiling, heating, hydrating and cooling.

The present invention resides in a new, useful and nonobvious combination of features combined to increase the efficiency of cooking all kinds of dehydrated powdered foods. Modern times call for improved food productivity, especially in parts of the world that desperately combat famine. With automation, the present invention can serve to increase the gross national product and therefore the productivity in countries that have large quantities of raw cassava and the like growing domestically, and whose populations rely on such foods for a large percentage of their diet. Because the time and energy usually spent preparing daily meals could be spent doing something more productive, the present invention can lead to higher living standards. Saving time and energy in basic necessities like the preparation of daily meals, even in the United States, can improve the lives of many.

SUMMARY

It is an object of the present invention to provide an apparatus and method to reduce the amount of labor required for cooking dehydrated powdered food.

It is another object of the present invention to provide an apparatus and method to reduce the amount of time it takes to cook dehydrated powdered food.

It is yet another object of the present invention to satisfy the long, deeply felt need for a consistent and reliable apparatus and method for cooking fufu flour which can improve the standard of living for millions of people in the United States and abroad.

The aforementioned objects of the present invention are achieved according to a preferred embodiment by providing a housing formed as a base and rigid support for housing a heater, a water boiler, a fan, a motor, and a drive system projecting upwards vertically to make connection with and to drive rehydration means. One such contemplated rehydration means is a rapid rehydration means which uses a removable paddle extending upward into a circular cooking container oriented for stirring in a generally circular manner about a vertical axis in the container within the housing. The paddle is structured and arranged such that it has at least one scraping edge portion for scraping the water and dehydrated powdered product vertically off the side wall of the container and horizontally off the floor of the container simultaneously, and at least one blade structured and arranged for folding and blending the water and product. One of many conceivable means for rotating the paddle is to employ a motor with a cam and drive which drives the paddle in both clockwise and counterclockwise directions. The container is removably attached on and maintained in heat transfer relation to the heater. The housing provides rigid vertical support for supporting a generally circular dispenser that holds and dispenses the product by rotating a bin over an open portion in its bottom to a point of alignment with an aperture in a lid of the container below it. One of many conceivable means for rotating the bin is to employ the same motor as that used by the paddle. Thus in the preferred embodiment, the means for rotating the bin and the means for rotating the paddle are one and the same. For efficient dispensing of the product, the closed portion of the bin has one or more ramps allowing gravity to force out substantially all of the product contents through the aperture. A closed container lid forms at the point of rotation of the bin when the closed portion of the dispenser bottom completely covers the aperture on the container lid. For efficient hydration, the container is shaped like a circular bowl and the paddle provides functionality and structure to scrape the sides and bottom of the container while stirring, blending and folding the mixture of the water and product. The housing contains a microprocessor, described herein as a controller, and a memory for executing and storing control programs for regulating the initiation and timing schedules for boiling water, dispensing the product, heating, cooling if needed, stirring and preparing the food according to options in the form of manual button entry means. One of many conceivable manual button entry means consists of at least one button switch on a control panel attached to the housing and electrically and physically connected to the controller and the memory. Product selection buttons for various foods like yam fufu, garri fufu, rice fufu, carrots, and other dehydrated powdered foods, will form the control panel options among other programmable functions that a particular food requires. The controller has temperature detection means comprising a temperature sensor which makes contact to pass thermal conduction of heat from the container. The controller employs a system clock to detect the passage of time and passes the time and temperature to the memory for use when the controller executes control programs preprogrammed or manually programmed by the user of the apparatus, allowing the controller to control and maintain the temperature of the container. The controller also controls cooling means for the apparatus. One such cooling means is a rapid cooling means comprising a fan structured and arranged to cool the container in conjunction with the controller's temperature detection means and memory to cool the container and to maintain a certain temperature of the container. One rapid water boiling means includes a water boiler used in conjunction with the heater while stirring, to reduce the amount of time it takes to initially get the water to a temperature approximating the boiling point of water. One conceivable water input means consists of manually pouring tap water into a reservoir contained in the housing for passing water through to be rapidly heated by contact with a heating element or a cartridge heater to accelerate the amount of time to bring water to a boil in conjunction with the heater heating the container. A learning mode is provided for manual cooking, which enables the user to program the machine for special requirements encountered for any food or under any cooking conditions such as for varying altitudes, air pressure and humidity at the location of cooking.

Examples of the special cooking requirements and processes for two types of dehydrated powdered foods are described below:

Yam Fufu

For four servings, 1 liter of water at room temperature in a container is brought to a temperature approximately in the range from 90° C. to 100° C., and preferably about 91° C.

About one half liter of Yam Fufu flour is dispensed into the container.

Paddle in container rotates several rotations first clockwise and then counter-clockwise during dispensing for uniform distribution of flour in the water and then continues in like manner for approximately five minutes as follows: thirty seconds clockwise; thirty seconds counter-clockwise; thirty seconds no rotation; thirty seconds clockwise; thirty seconds counter-clockwise; thirty seconds no rotation, and continues in this fashion.

Fan is activated to reduce temperature of container to a temperature appropriate for human consumption, approximately in the range from 60° C. to 80° C., and preferably about 73° C., when fan is deactivated.

Warming light and buzzer sounds indicating completion.

Garri Fufu

For four servings, 1 liter of water at room temperature in a container is brought to temperature approximately in the range from 70° C. to 100° C., and preferably about 77° C.

About one half liter of Garri Fufu flour is dispensed into the container.

Paddle in container rotates several rotations first clockwise and then counter-clockwise during dispensing for uniform distribution of flour in the water. No paddle rotation for approximately three minutes while soaking. Then paddle rotation continues for thirty seconds clockwise; thirty seconds counter-clockwise; thirty seconds clockwise; thirty seconds counter-clockwise, and continues in this fashion for approximately two minutes.

Fan is activated to reduce temperature of container to a level appropriate for human consumption, approximately in the range from 60° C. to 80° C., and preferably about 73° C., when fan is deactivated.

Warming light and buzzer sounds indicating completion.

BRIEF DESCRIPTION OF THE DRAWINGS

The details of the present invention will be described in connection with the accompanying drawings, in which.

DESCRIPTION

Figure 1:
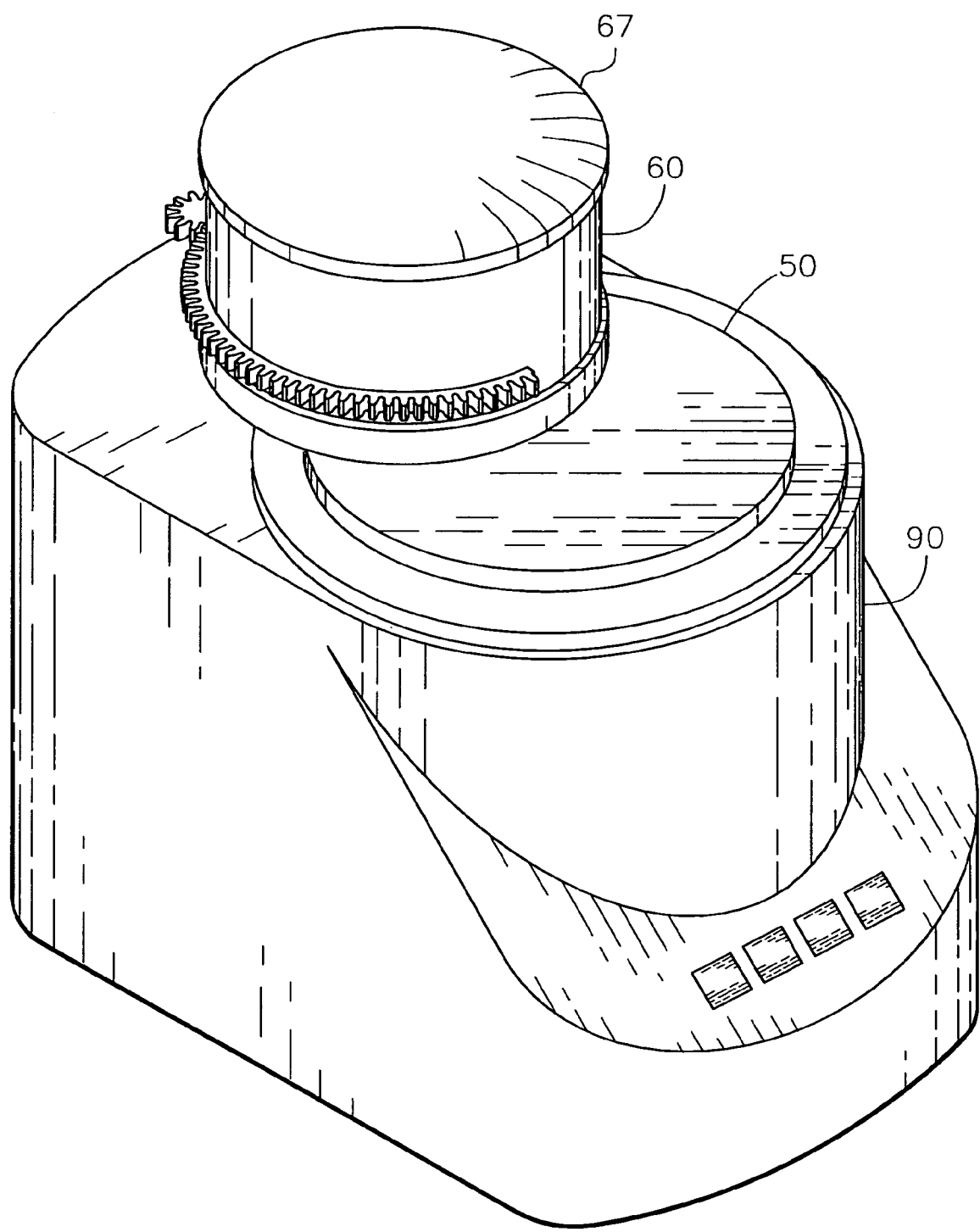
FIG. 1 is a perspective view showing an assembled housing according to one embodiment of the present invention.
Figure 2:
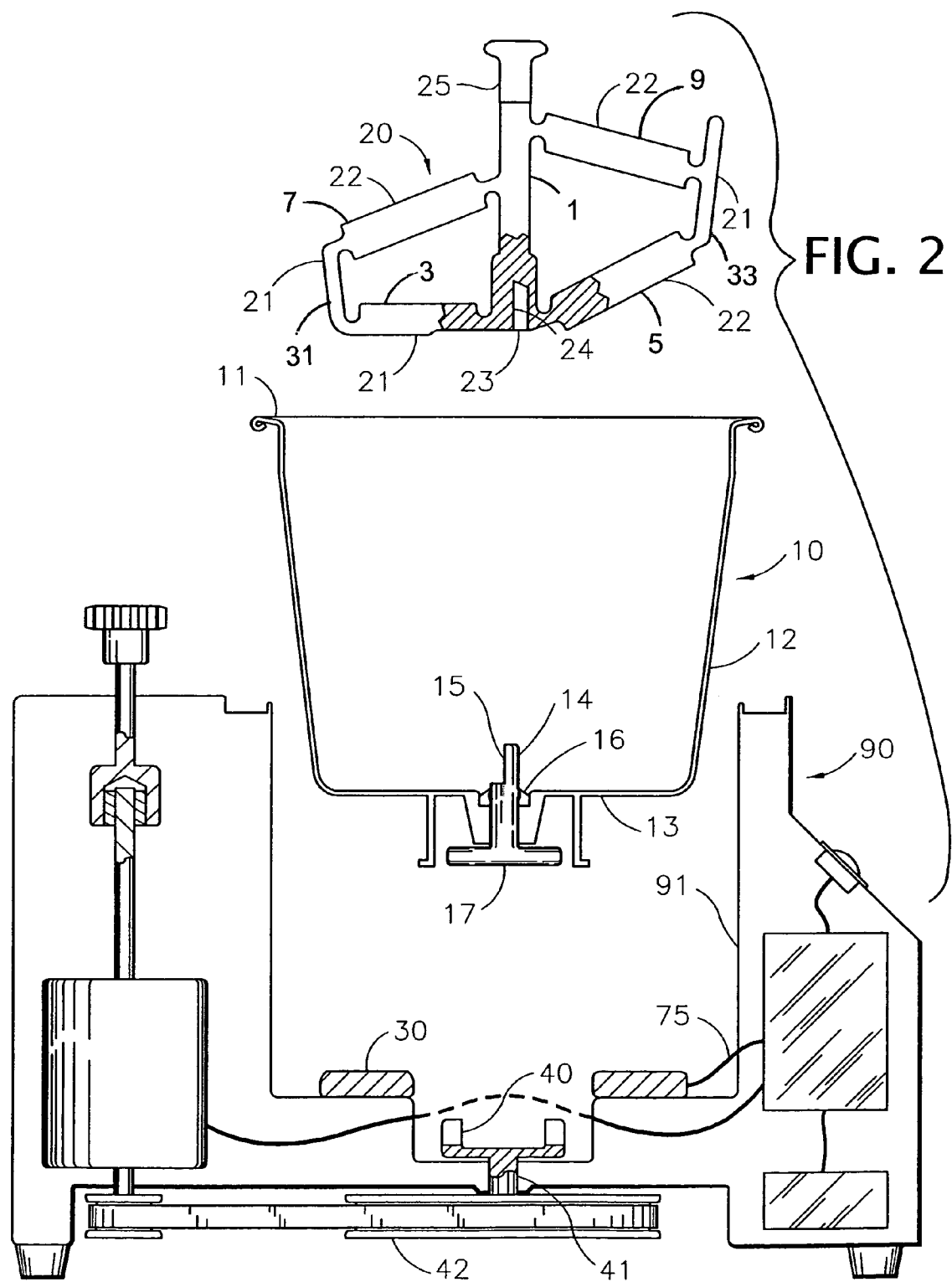
FIG. 2 is an exploded cross-sectional side view showing how a paddle and a container fit into the housing according to one embodiment of the present invention.

FIG. 1 shows the present invention having a housing 90, a lid 50, a bin 60 and a cap 67. FIG. 2 shows a container 10, which is removable from the housing 90. The container 10 has a rim 11, a side wall 12, and a floor 13. The floor 13 of the container 10 is fitted to receive a rotatable first shaft 14 having a first flat 15. The first shaft 14 is sealed against leakage by a seal 16. The bottom of the first shaft 14 has the shape of a bar 17.

Rehydration of the powdered food product is accomplished in the present invention by stirring the product in heated water with an implement. All embodiments of the present invention involve some form of rehydration means which can comprise a removable paddle 20 used to agitate the food being cooked in the container 10. The paddle 20 has a handle 25 attached at an elevation higher than the anticipated food level. In one embodiment of the present invention, the handle 25 enables manual installation of the paddle 20 onto the shaft 14, and for removal of the paddle 20 after the food is automatically cooked using the apparatus.

The paddle 20 has at least one scraping edge portion 21, which simultaneously scrapes near the side wall 12 and floor 13 of the container 10. The term "scraping" should be understood to define possible sliding contact with the side wall 12, but it is also considered "scraping" where the scraping edge portion 21 passes nearby side wall 12 without touching. Up to about one quarter inch away is sufficient to prevent food build-up. The paddle 20 has at least one blade 22, which by its movements fold and blend the central portions of food. There is a d hole 23 in the bottom of the paddle 20 of a size suitable to fit around the first shaft 14. The d hole has a second flat 24 of a size suitable for mating with first flat 15 for preventing relative rotation between the first shaft and paddle 20, thus torque and rotation of the first shaft can be imparted to the paddle 20.

The paddle 20 has a central member 1, a pair of lower blades 3 and 5, and upper blades 7 and 9. Connecting members 31 and 33 connect the outer ends of respective blades.

While the paddle 20 has been shown keying to first shaft 14 by means of two mating flats for purposes of illustration, the present invention would work equally well using other keying means such as splines, keyways, square shapes or the like, so long as the paddle 20 can be slidably removed. The container 10 and paddle 20 are preferably made of metal for strength and durability. They may be coated with an anti-stick material for easy cleaning. The container material should be especially selected for high heat conductance to promote rapid heat-up. However, material conducive for use with a microwave oven would be preferable in such an alternative embodiment.

Also shown in FIG. 2 is a first embodiment of heater 30 comprising a heater having a ring shape. The heater 30 is positioned at the bottom of a recess 91 in the housing 90. The heater 30 has a high electrical resistance for generating heat when an electrical current is applied by first cable 75. At the center of the bottom of the recess 91 there is a fork 40 at the top end of a second shaft 41. There is a large pulley 42 at the bottom end of the second shaft. The second shaft is fitted to rotate in the housing. The fork has a shape suited to interlock with the bar 17 when the container 10 is fitted into the recess 91.

Figure 2A:
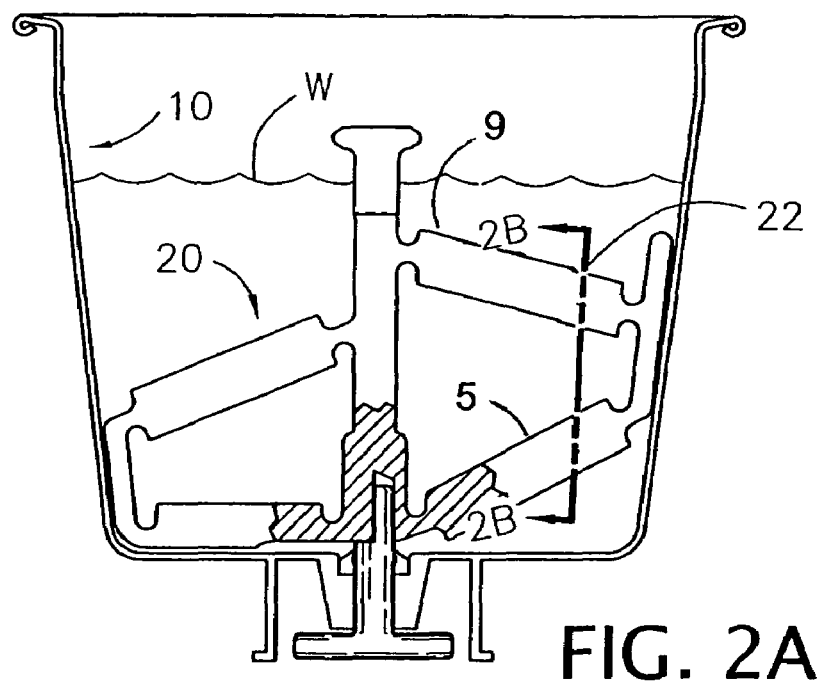
FIG. 2A is a cross-sectional side view showing the paddle fitted to the container filled with water W.
Figure 2B:
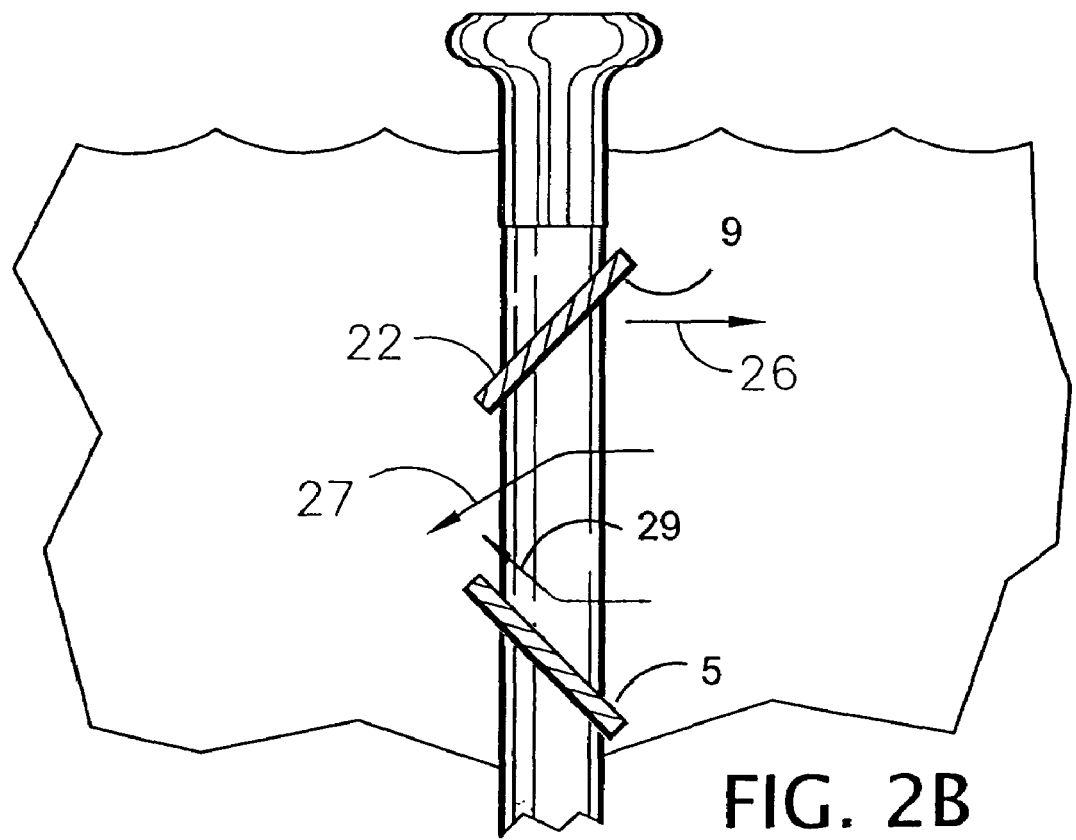
FIG. 2B is a cross-sectional view taken on line 2B-2B in section 2A showing the folding action of the blade.

FIG. 2A shows the paddle 20 placed in the container 10 and full of fresh water W at room temperature, which can come from any source (natural, bottled or common tap water) but is preferably filtered. A cross section taken along line 2B-2B is shown in FIG. 2B where the lower and upper blade 5 and 9 are shown with opposing angles with respect to a vertical plane. If the paddle 20 is rotated so that the blades have a motion in the direction shown by the arrow denoted by reference numeral 26, then the water is agitated and also deflected downward in a direction shown by the arrow denoted by reference numeral 27 and deflected upward in a direction shown by the arrow denoted by reference numeral 29. If the paddle rotation is reversed, then the water will be deflected in the opposite directions shown. The amount of angle each blade 5 and 9 makes with a vertical plane is preferably complementary to each other such that the upward and downward forces provided by the deflected water and product (after dispensing) are substantially equal to prevent lifting of the paddle 20 from the shaft 14.

Figure 3:
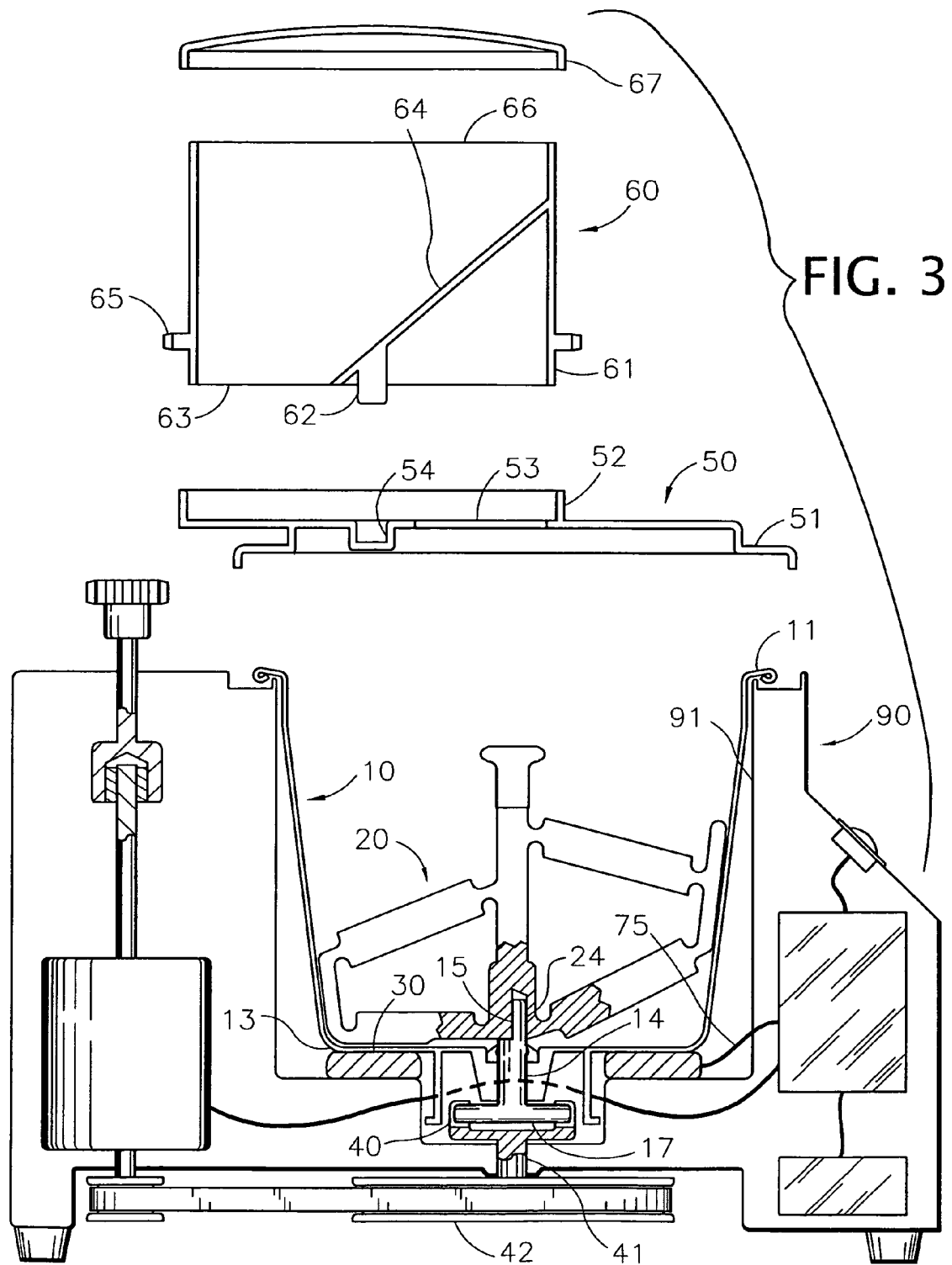
FIG. 3 is an exploded cross-sectional side view showing how a lid, a bin, and a cap fit onto the housing according to one embodiment of the present invention.

FIG. 3 shows the paddle 20 fitted into the container 10, and the container 10 fitted into the recess 91. The recess 91 has a size and shape suitable to receive the container 10 such that the floor 13 of the container 10 makes surface contact with the top of the ring 30 for maintaining a heat transfer relation. The floor 13 could alternatively be flat or concave. Other shapes are possible. Now the bar 17 can be seen interlocking with fork 40, so that torque and rotation of the second shaft 41 can be imparted to first shaft 14. While these particular parts have been shown for purposes of illustration; the present invention would work equally well using other interlocking means such as fingers, splines, cams or the like, so long as the container 10 can be vertically removed. The container 10 has a tab (not shown) which fits into a pocket (not shown) in the recess 91, which can be readily understood to prevent the container 10 from turning in reaction to the torque from second shaft 41.

FIG. 3 also shows the lid 50, which has a lip 51 of a size to fit over the rim 11 of the container 11. The lid has a circular fence 52 and a socket 54 at the center of the fence. At a certain position over container 10 there is an aperture 53 in the lid. The bin 60 has a generally cylindrical wall 61 having a size suitable for fitting inside the fence. There is a sloping ramp 64 attached to a portion of the inside of the cylindrical wall. There is an open portion 63 at the bottom of the bin 60, not covered by the ramp 64. There is a pin 62 attached under the ramp 64 and located at the center of the cylindrical wall. The pin is of a size suited to fit inside the socket. There is a sector gear 65 attached to a portion of the cylindrical wall. There is a circular opening 66 in the top of the bin 60. The cap 67 is sized to fit over the circular opening 66 for protecting the contents of the bin 60. All parts of the lid, bin 60, and cap are preferably molded of a clear plastic of a type having high impact resistance and good resistance to high temperature water exposure.

Now it can be appreciated that the five parts: the container 10, paddle 20, lid 50, bin 60, and cap 67 have been designed for easy removal. Thus, they can be cleaned or placed in a dishwasher, making the apparatus convenient for reuse.

Figure 4:
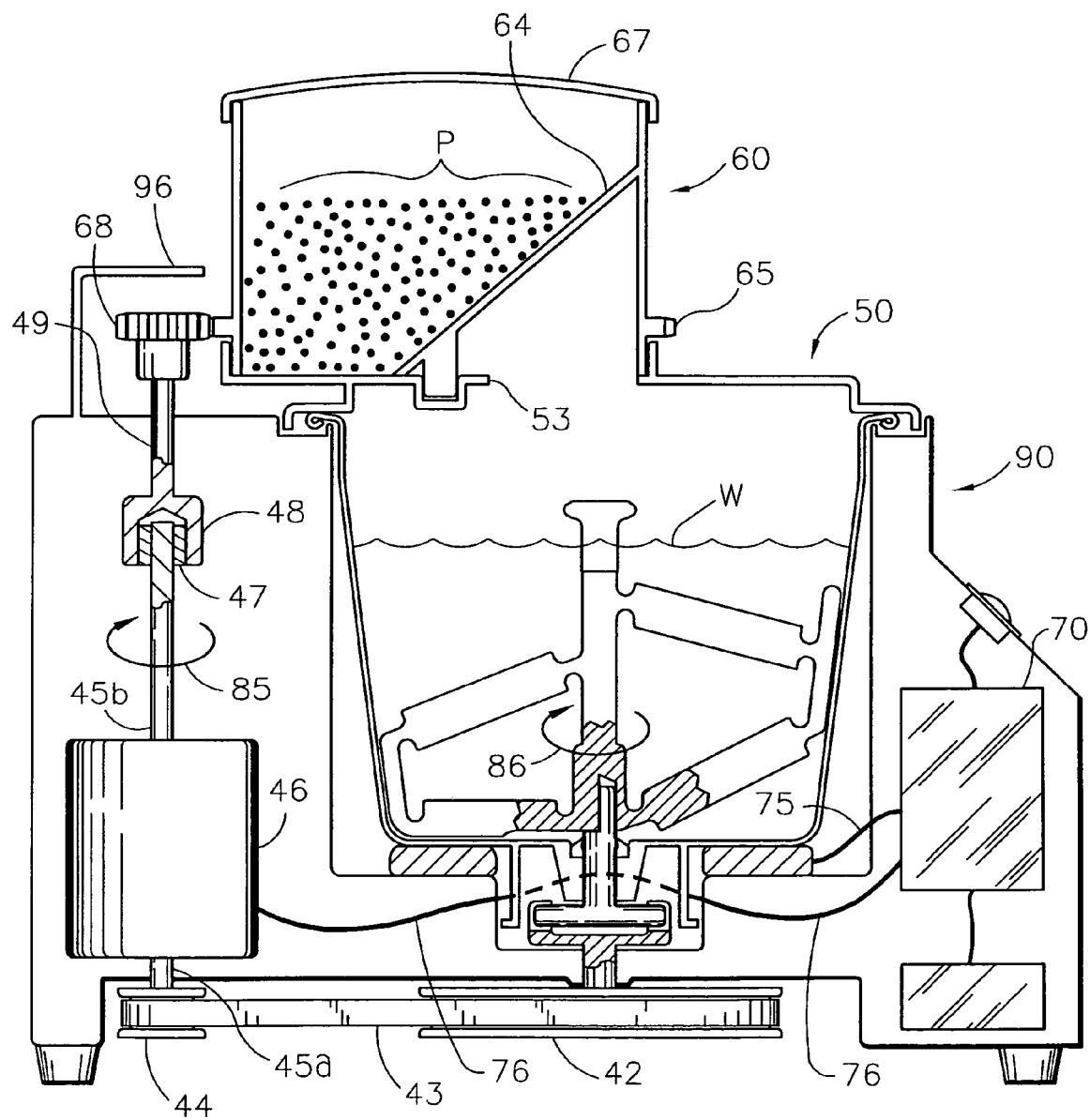
FIG. 4 is a cross-sectional side view showing water in the container and a dehydrated powdered product in the bin at a closed position according to one embodiment of the present invention.

FIG. 4 shows a cross sectional side view of the present invention with all of the previously described parts in place, ready for cooking. The large pulley 42 is powered by a belt 43, driven by a small pulley 44 which is connected to a lower motor shaft 45a driven by motor 46 powered by second cable 76 connected to a controller 70. In this way, rotary motion and torque from the motor 46 can be imparted to the paddle 20 for stirring.

Figure 6A:
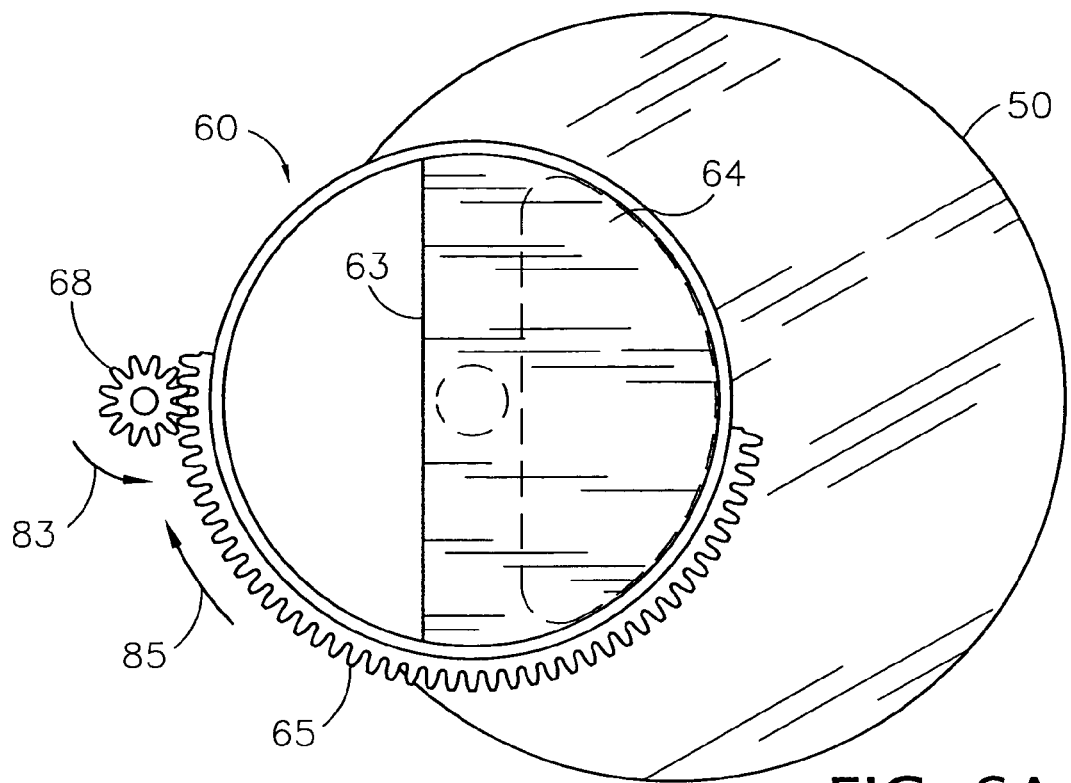
FIG. 6A is a partial top view of the unit with the cap removed, showing the bin in the closed or starting position according to one embodiment of the present invention.

The rotary position of the bin 60 is shown in FIGS. 4 and 6A at a closed position wherein the ramp 64 covers the aperture 53 in the lid 50. In this way, the dehydrated powdered product P can be stored inside the bin 60 and not fall through into container 10.

There is a one way clutch 47 in slipping contact with an upper motor shaft 45b when the upper motor shaft is turning clockwise (as viewed from above) as indicated by the arrow noted by reference numeral 85. There is a holder 48 for the one way clutch at the bottom end of a fifth shaft 49 which is rotatably fitted in the housing 90. There is a gear 68 at the top end of the fifth shaft having a tooth meshing fit with the sector gear 65 on the bin 60. A protective cover 96 protects against outside material getting caught in between the gear 68 and the sector gear 65. By powering the motor 46 to turn clockwise 85, the water W in the container 10 may be stirred while heated as indicated by the arrow noted by reference numeral 86, but there will be no rotation of fifth shaft 49 and consequently no rotation of bin 60. Stirring and heating without dispensing can be advantageous since it serves to reduce the time it takes to initially heat the water to desired levels.

Figure 5:
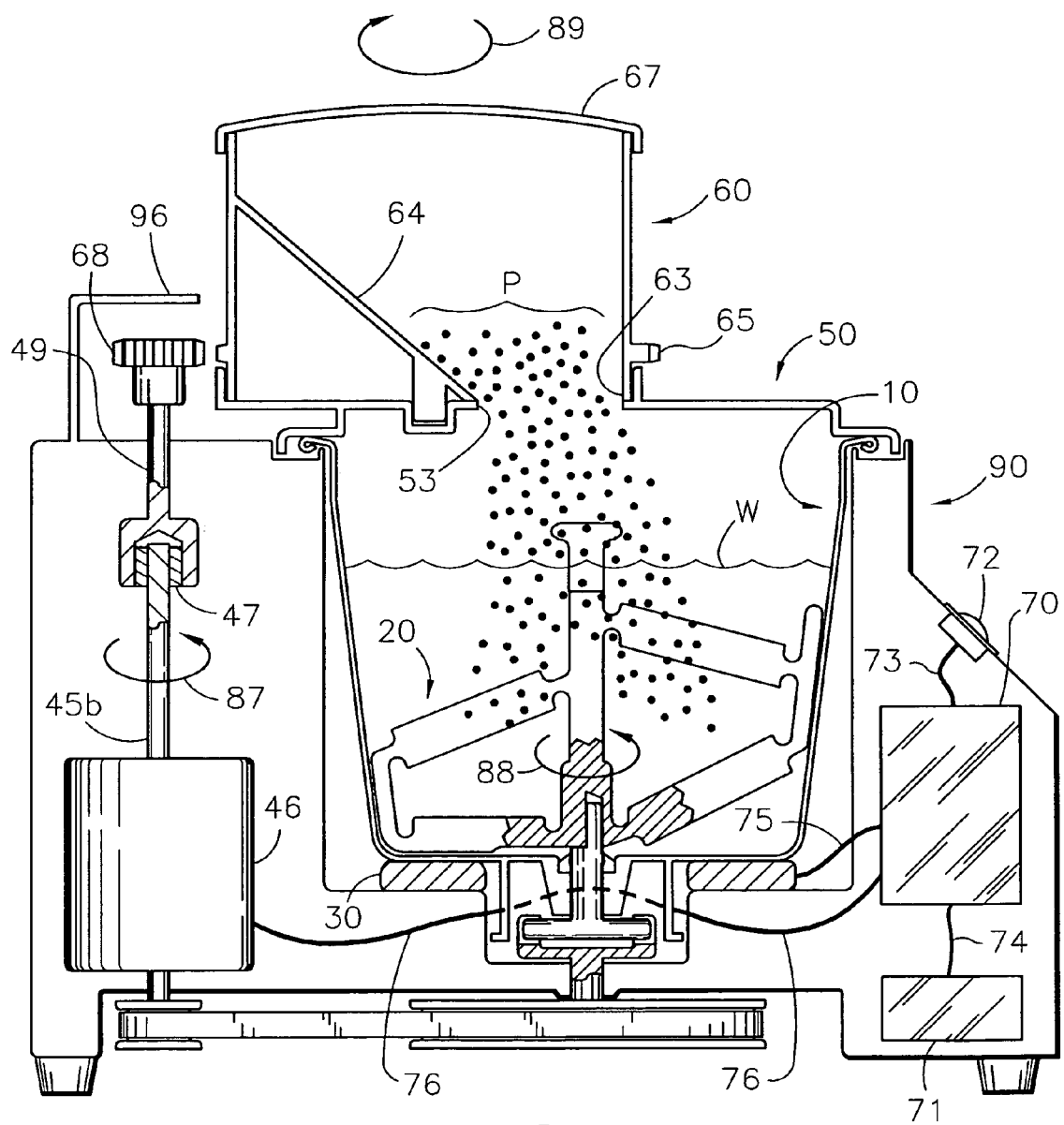
FIG. 5 is a cross-sectional side view showing the bin rotated to an open position whereby the dehydrated powdered product is dispensed into the water in the container according to one embodiment of the present invention.
Figure 6B:
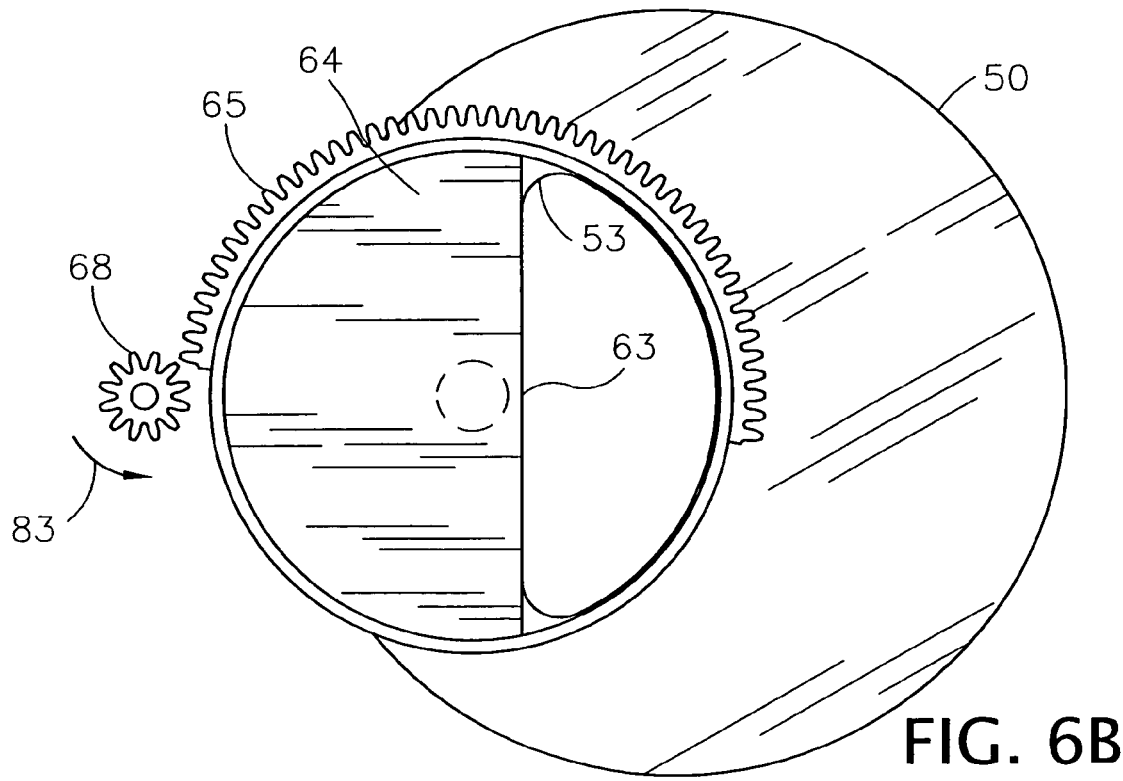
FIG. 6B is a partial top view of the unit with the cap removed, showing the bin in the open or dispensing position according to one embodiment of the present invention.

FIG. 5 shows how the dehydrated powdered product P can be dispensed from the bin 60 into the container 10 by powering the motor 46 to rotate counter-clockwise (as viewed from above) as indicated by the arrow noted by reference numeral 87 so that the paddle 20 rotates counterclockwise (as viewed from above) as indicated by the arrow noted by reference numeral 88. Since the one way clutch 47 locks in turning unison with the upper motor shaft 45b, then fifth shaft 49 and gear 68 both rotate in unison with the upper motor shaft 45b. Then the bin 60 is powered to rotate in a clockwise direction (as viewed from above) as indicated by the arrow noted by reference numeral 89. When the bin 60 rotates, the bin open portion 63 passes over the lid aperture 53 and, influenced by gravity, the dehydrated powdered product P drops into the container 10. The angle of the surface of the ramp 64 is sufficient to assure that the powdered product does not adhere. The rate at which the powdered product dispenses can be controlled by the rate of bin rotation. A gradual dispensing action may be desirable to prevent lumpiness in the final food product. When the bin 60 rotates to the open or dispensing position, all bin rotation stops because the sector gear 65 becomes disengaged from gear 68. Even if gear 68 continues to turn, no further bin turning is possible. Now as shown in FIGS. 5 and 6B the bin 60 has been rotated to an position.

The disengagement of the sector gear is a safety feature. Furthermore, if the bin 60 were somehow rotated so the gears meshed again, the one way clutch would assure that the bin 60 could only turn so the passage opens and could never turn to cause closing.

After the bin 60 reaches the open or dispensing position, the motor 46 can be reversed as desired without causing further bin movement. Reversing the paddle direction, and hence the folding and blending action, accelerates stirring and mixing.

While the bin 60 has been shown as powered by a one way clutch, the inventor envisions another embodiment of the present invention wherein an electric clutch is substituted for the one way clutch wherein the electric clutch is powered selectably by the controller 70.

While the bin 60 has been shown as powered by a one way clutch, the inventor envisions yet another embodiment of the present invention wherein a second electric motor is substituted for the one way clutch wherein the electric motor is powered selectably by the controller 70.

While a rotary bin 60 has been shown byway of illustration as a dispenser, the inventor envisions another embodiment of the present invention wherein the dispenser 60 comprises a translating rather than rotary bin, wherein the bin 60 has an open portion for sliding linearly over an aperture in the lid.

While a rotary bin 60 has been shown byway of illustration as a dispenser, the inventor envisions another embodiment of the present invention wherein the dispenser comprises a bin 60 fitted with an auger feeder driven by a second electric motor powered selectably by the controller 70.

While a rotary bin 60 has been shown by way of illustration as a dispenser, the inventor envisions another embodiment of the present invention wherein the dispenser comprises a bin 60 fitted with a trap door held in place at times by a solenoid latch, whose release is powered selectably by the controller 70.

There is a first embodiment of a controller 70 having electrical components for switching input power from a power cordset (not shown) to the heater 30 and the motor 46 according to a predetermined time schedule which is stored in a memory 71. Although the memory is shown as being physically separate from the controller 70 and connected by a third cable 74, it may also be configured as a component residing in the controller 70. The operator can choose to activate the controller 70 or store the time schedule in the memory by utilizing a manual button entry means comprising one or more button switches 72, located generally at the front of the housing 90. While one button switch is shown for clarity connected to the circuit board by fourth cable 73, other button switches may be used, each with a corresponding cable, to perform needed actions and settings. While a button switch 72 is shown, other types of switches, such as membrane, toggle, rocker, slide, or rotary, may be used.

A preferred embodiment of the present invention includes a learning mode for manual cooking which enables the user to program the machine for special requirements encountered for any dehydrated powdered food or under any cooking conditions such as for varying altitudes, air pressure and humidity at the location of cooking. Starting a manual mode cooking process places the apparatus in learning mode. It will place each manual operation and the time durations between each event in the memory 71, creating a stored program schedule for each special product situation. It will also place in memory 71 the temperature used to cook the food and any temperature changes during different steps. After completion of the manual cooking process, the sequence will be remembered in memory 71 until the start of the next manual cooking session. At any time while the process is in memory 71, the user has the opportunity to save the process in the apparatus memory 71 for future use by pressing an appropriate button switch 72.

FIG. 6A is a partial top view of the present invention corresponding to the position of parts previously shown in FIG. 4. The cap 67 has been removed, showing more clearly how the bin 60 acts as a dispenser. The bin is put in place on the lid 50 with a rotary orientation where the chute 64 covers the aperture 53 seen in FIG. 4. Sector gear 65 meshes with gear 68. Powdered product P in the desired amount is placed in the bin. In order to dispense the powdered product, the gear 68 will turn in the direction shown by the arrow denoted by reference numeral 83, driving the sector gear and bin 60 to turn in the direction shown by the arrow denoted by reference numeral 85.

FIG. 6B is a partial top view of the present embodiment corresponding to the position of parts previously shown in FIG. 5. The position and length of the sector gear 65 was selected to cause the bin 60 to stop rotating at a position where the open portion 63 in the bin has aligned with the aperture 53 in the lid 50. No further bin rotation is possible, even if the gear 68 continues to rotate, or reverses direction, because the sector gear has become disengaged.

Figure 7:
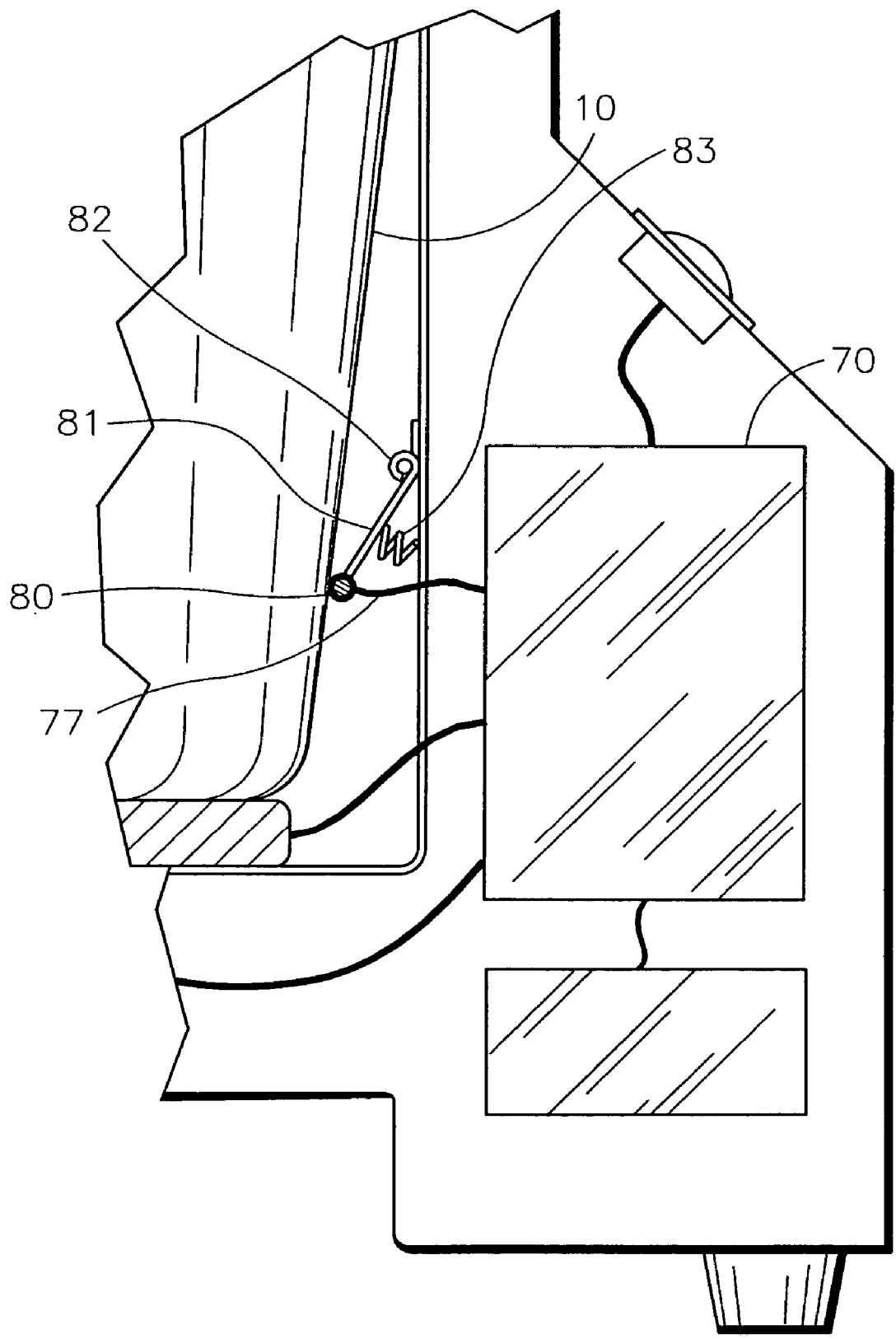
FIG. 7 is a partial enlarged cross-sectional side view showing a temperature sensor according to one embodiment of the present invention.

For clarity, FIG. 7 shows an enlarged view of another feature of a preferred embodiment which is a temperature detection means comprising a temperature sensor 80 making contact for thermal conduction with the container 10. The temperature sensor 80 could be a thermistor or thermocouple or the like, whose electrical characteristics change in a prescribed manner in proportion to temperature. The controller 70 is in communication with the temperature sensor 80 by a fifth cable 77. It is important for the sensor 80 to make contact with the container 10 in spite of tolerances in the manufacturing of the various parts. Therefore, the temperature sensor 80 is mounted on an arm 81 movable by a hinge 82 and urged against the container 10 by a spring 83. Besides rotating as shown by way of illustration, the inventor envisions others ways of biasing the temperature sensor 80 against the container 10 such as a spring loaded plunger for translating movement, and the like. The controller 70 uses the temperature signal input to make decisions about modulating the output power to the heater 30.

Figure 8:
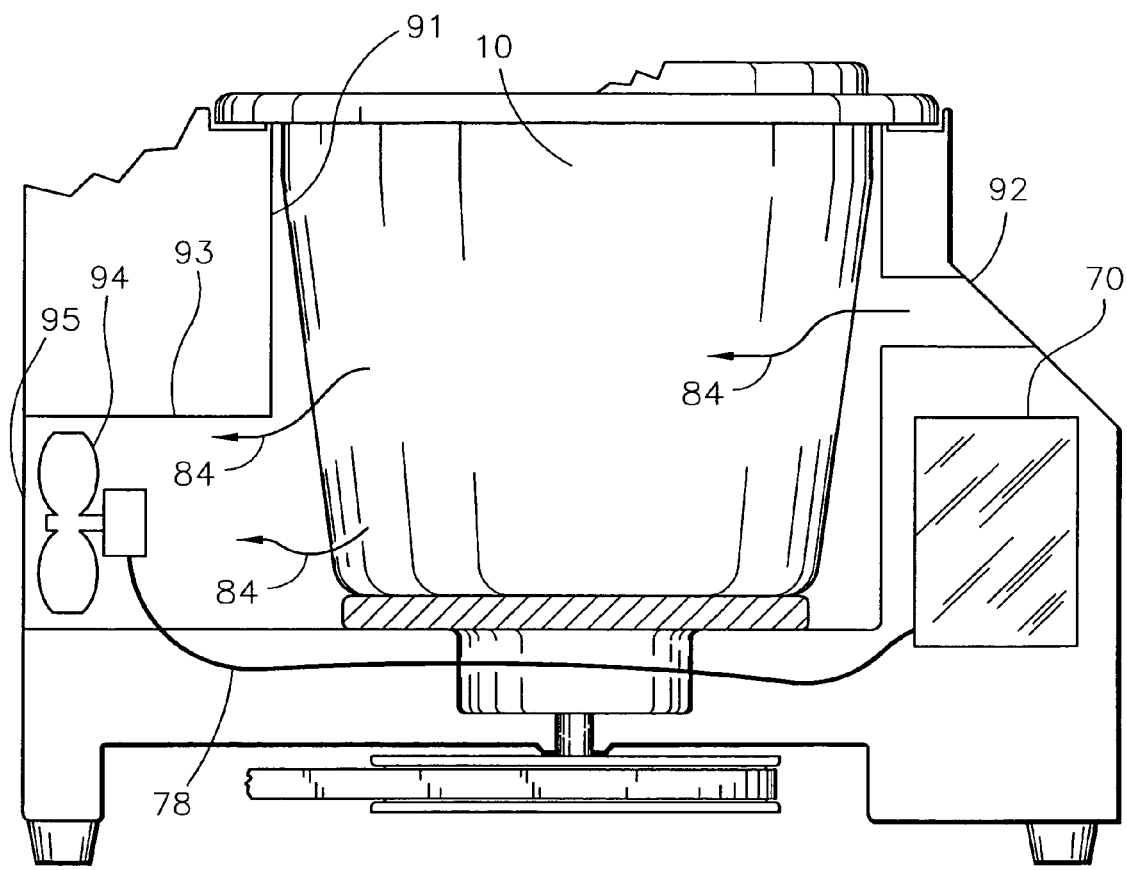
FIG. 8 is a partial cross-sectional side view showing a means for cooling according to one embodiment of the present invention.

FIG. 8 shows an alternate embodiment of the present invention comprising many of the elements of a preferred embodiment, and further comprising a cooling means for cooling the cooked food product comprising a forced air ventilation system having an intake 92 directing airflow to and around the container 10 as denoted by reference numerals 84 and pulled along a duct 93 by a motorized fan 94 to exit at an exhaust 95. Thus, certain food products, notably garri, can be rapidly cooled for improved consistency according to another embodiment of controller 70 which comprises the same functions as before and further comprises power means for driving the motorized fan 94 by sixth cable 78. Other cooling means contemplated comprise circulating a refrigerant through a coil and compressor as in an air conditioner around the container 10, or circulating cool water, or water at room temperature, around the container 10.

Figure 9:
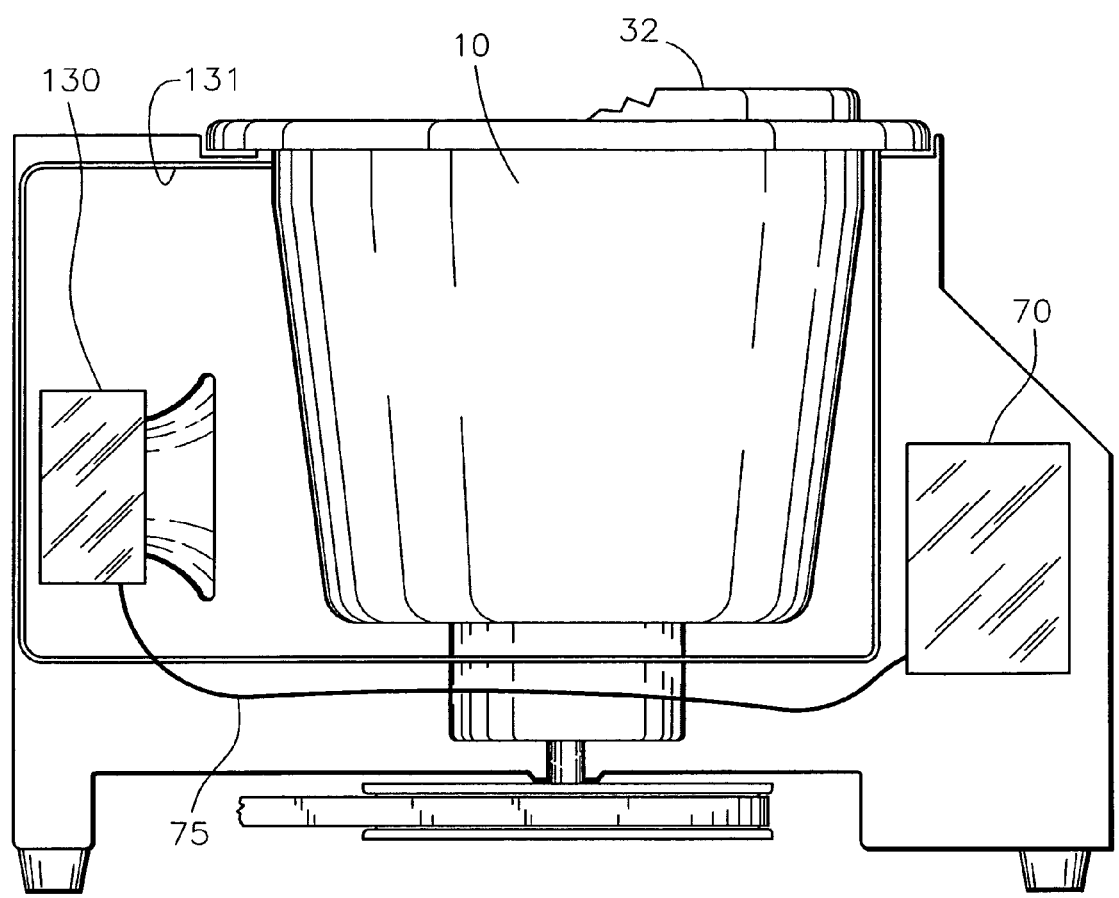
FIG. 9 is a partial cross-sectional side view showing an alternate embodiment having a heater comprising a microwave generator.

FIG. 9 is an alternate embodiment of the present invention in which a second embodiment of heater, which provides rapid water boiling means, comprises a microwave generator 130 positioned for focusing microwave energy toward a nonmetallic container 10. The microwave energy causes the molecules of the water or food product in the container 10 to become energized and heat up. There is a shielded enclosure 131 surrounding the container 10 and microwave generator 130 along with a shielded lid 32 to prevent the escape of potentially harmful microwave energy. Another embodiment of controller 70 comprises the same functions as other embodiments and further comprises power means for driving the microwave generator 130 by first cable 75.

Figure 10:
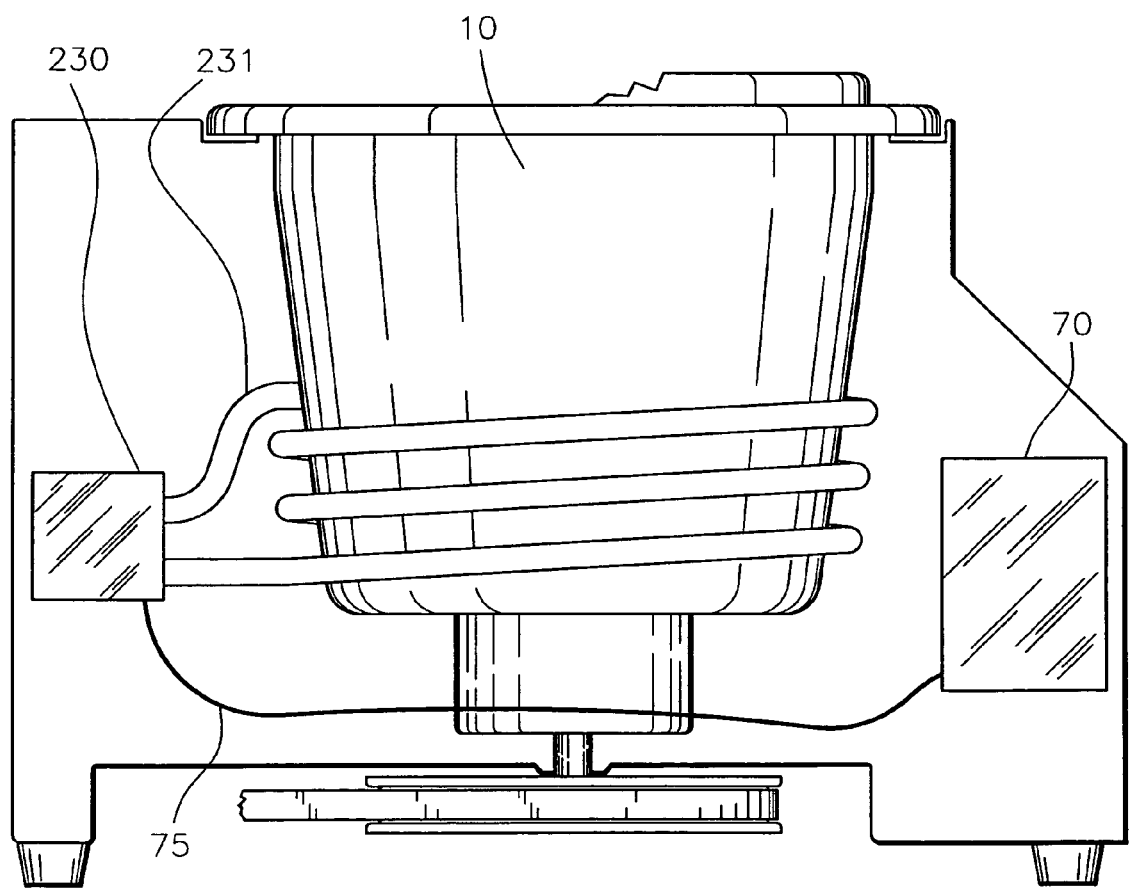
FIG. 10 is a partial cross-sectional side view showing an alternate embodiment having a heater comprising a radio frequency generator.

FIG. 10 is an alternate embodiment of the present invention in which a third embodiment heater comprises a radio frequency generator 230 which creates a changing magnetic field in a coil 231 for induction heating of a container 10 which is made of a magnetic material. Induction heating causes the container 10 to heat, which in turn conducts heat to the water or food product. Another embodiment of controller 70 further comprises power means for driving the radio frequency generator 230 by first cable 75.

Figure 11:
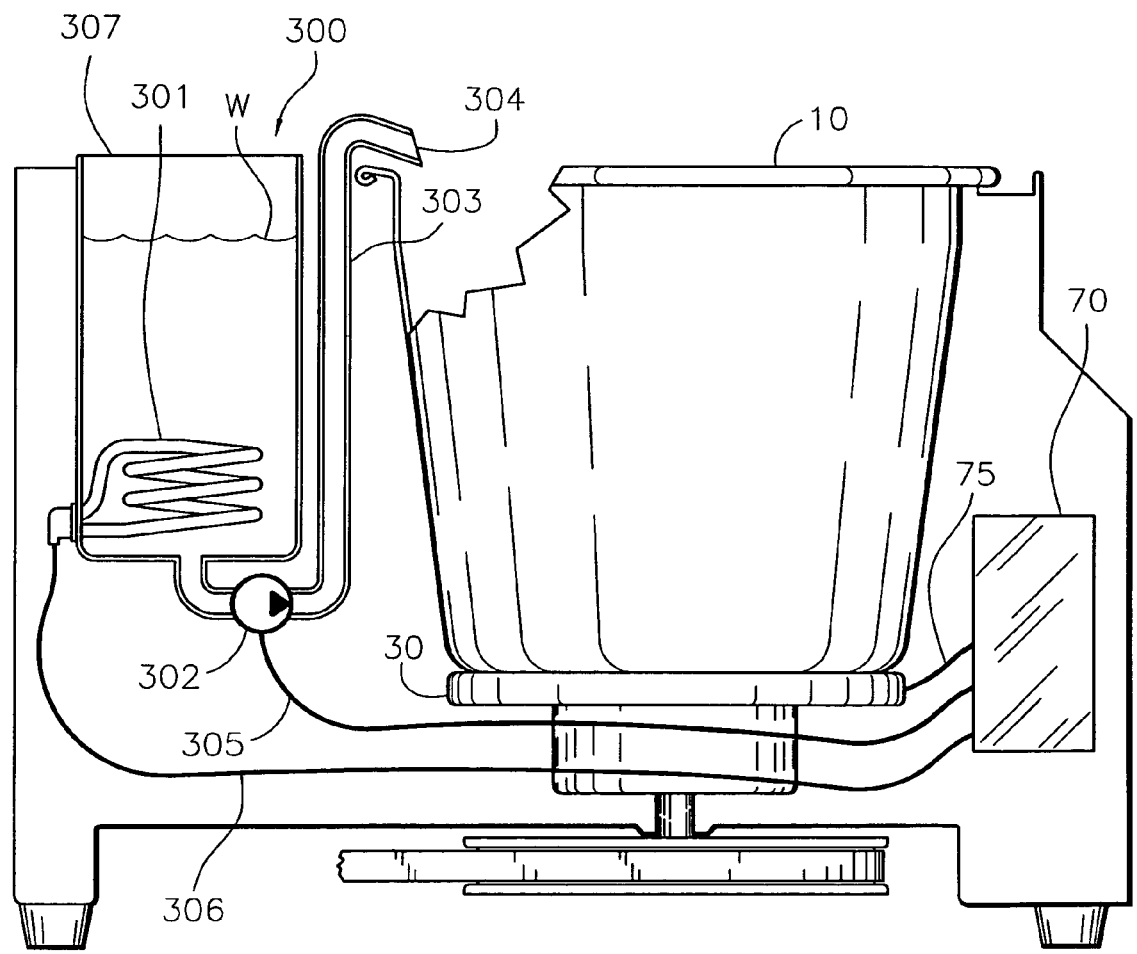
FIG. 11 is a partial cross-sectional side view showing an alternate embodiment having a heater and a boiler comprising a reservoir, a heating element, a pump and a spout.

FIG. 11 shows an alternate embodiment of the present invention in which a heater 30 is used in addition to a first embodiment of a boiler 300 for heating water W before its introduction into the container 10. There is a reservoir 307 comprised of a heating element 301 which is enclosed in the reservoir 307 by means of an electrically insulated connector to a seventh cable 306. After heating, the water is moved from the reservoir 307 into the container 10 by an electric pump 302 by way of a tube 303 and a spout 304. Another embodiment of controller 70 comprises the same functions as prior embodiments and further comprises driving the heating element 301 by seventh cable 306 and driving the pump by eighth cable 305. This embodiment of the present invention would work equally well having instead a heater attached inside or outside of the reservoir 307. This embodiment of the present invention would work equally well if the reservoir 307 were positioned higher than the container 10 for gravity draining into the container 10, selectable through a valve, which would take the place of the pump.

Figure 12:
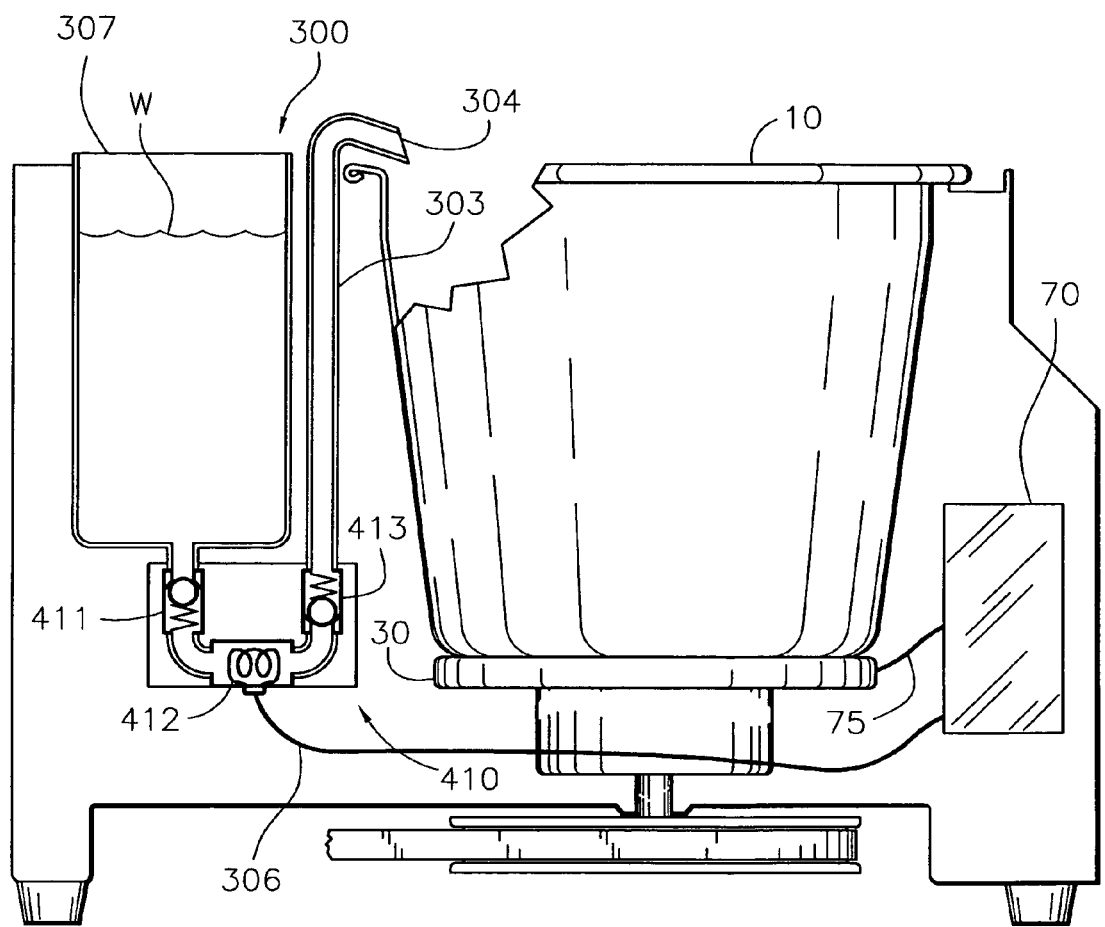
FIG. 12 is a partial cross-sectional side view showing another embodiment having a heater and a boiler comprising a reservoir, a heater cartridge, and a spout.
Figure 13A:
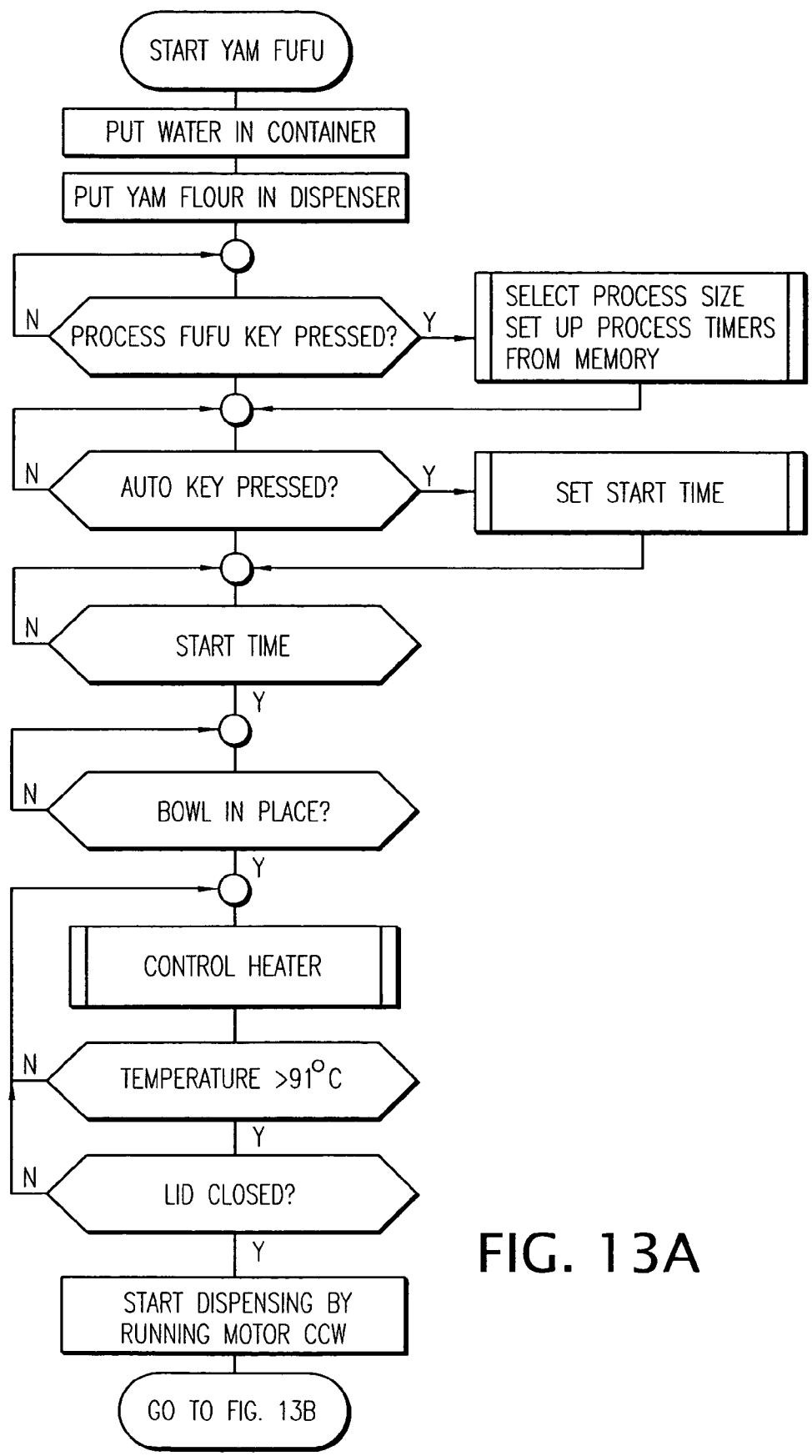
FIGS. 13A and 13B depict a flow diagram showing flow of control in a preprogrammed embodiment for cooking yam fufu using an automatic apparatus.
Figure 13B:
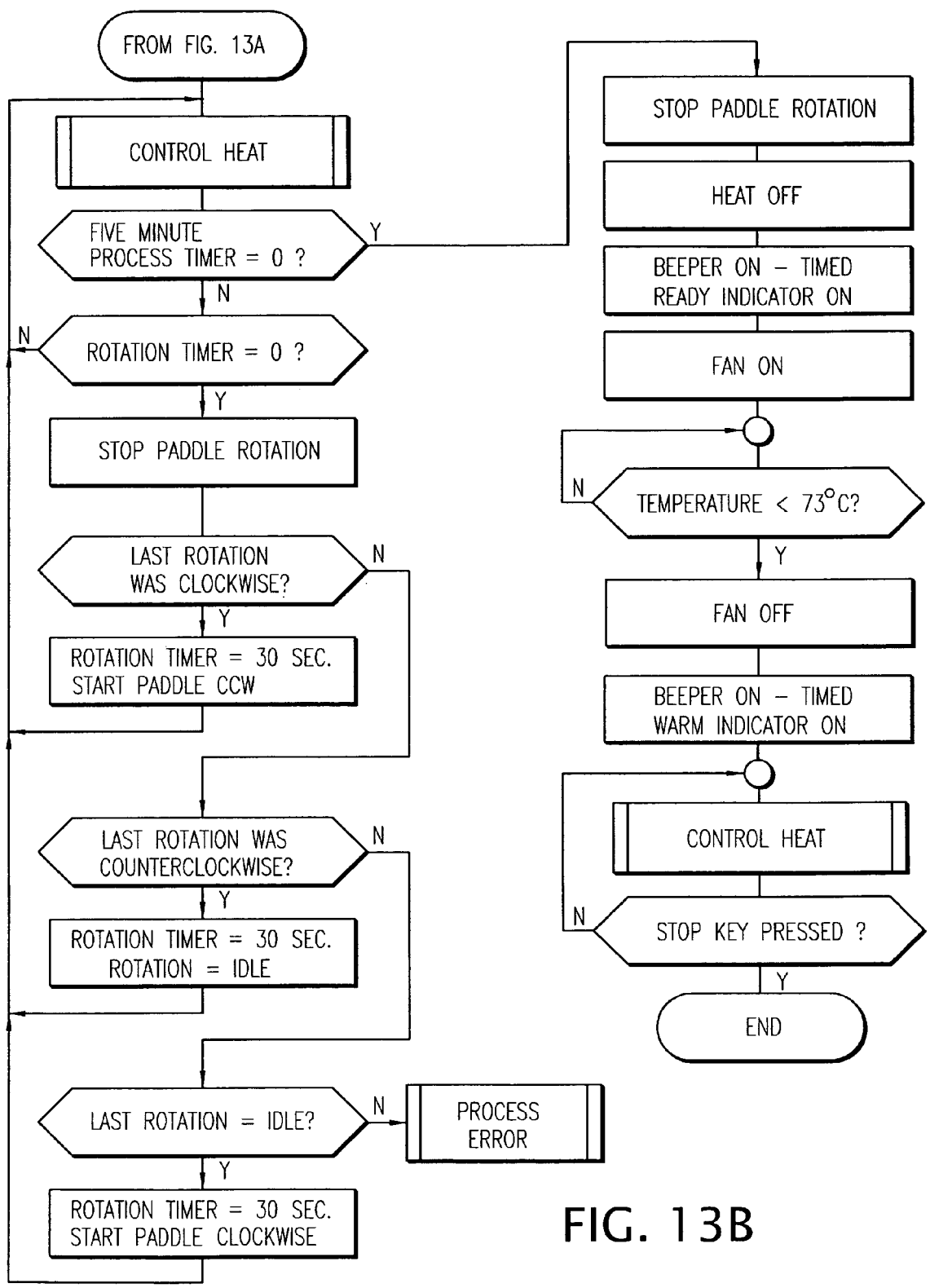
Figure 14A:
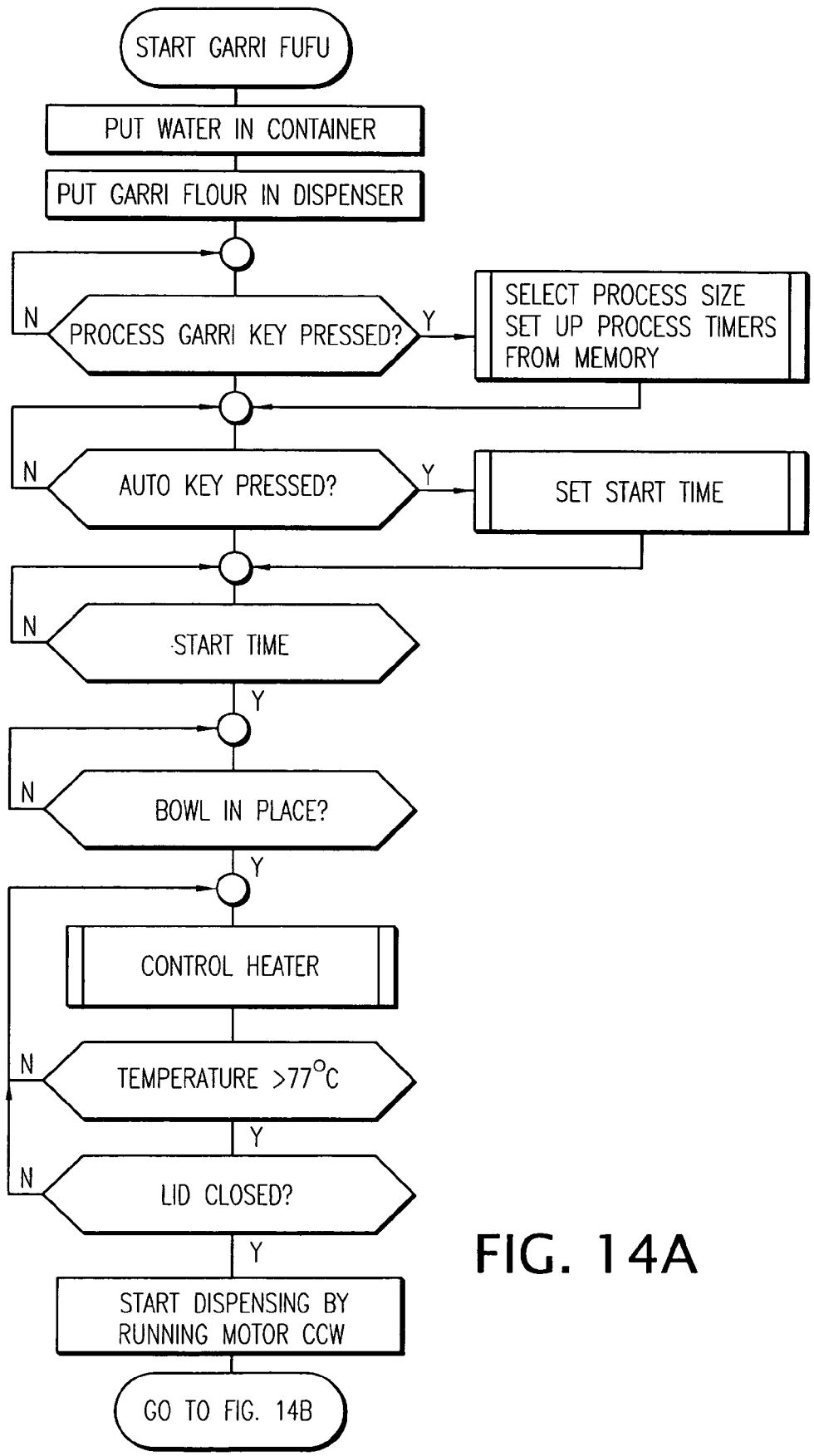
FIGS. 14A and 14B depict a flow diagram showing flow of control in a preprogrammed embodiment for cooking garri fufu using an automatic apparatus.
Figure 14B:
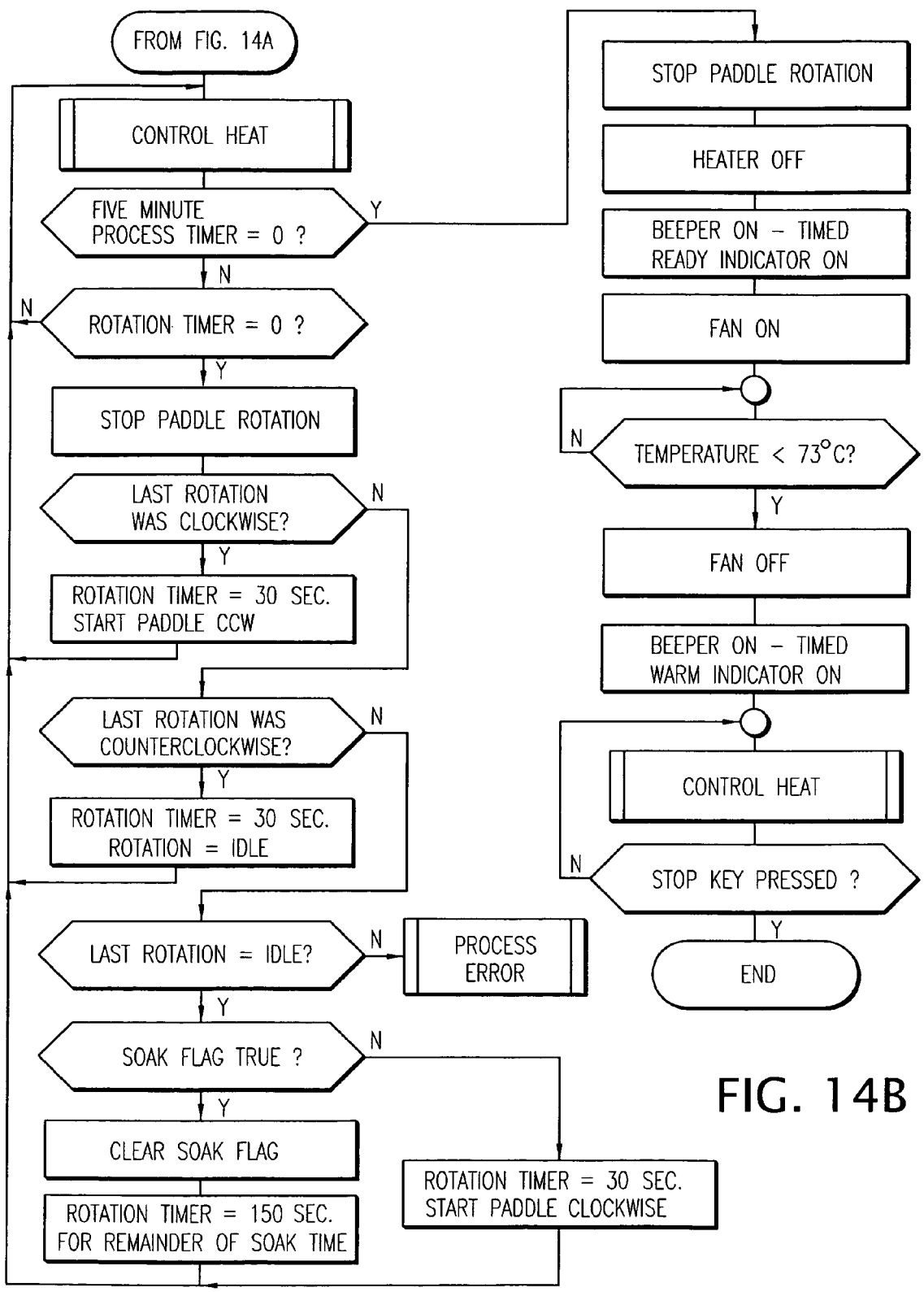

FIG. 12 shows yet another alternate embodiment of the present invention in which a heater is used in addition to the boiler 300 for holding a supply of tap water W. There is a heater cartridge 410, which heats and pumps the water toward and into the container 10 by way of tube 303 and spout 304. The heater cartridge 410 comprises a first check valve 411, a heating coil 412, and a second check valve 413. The water local to the heating coil 412 boils making expanding water vapor bubbles. This extra volume cannot move back into the reservoir 307 because it is blocked by the first check valve 411. Therefore, pressure caused by the extra volume moves the fluid through the second check valve 413. The inertia of moving the new cool water causes a partial pressure reduction, which draws new cool water to enter the cartridge through the first check valve 411. Thus the water is moved in successive pulses toward the container 10. Another embodiment of controller 70, comprises the same functions as prior embodiments and further comprises power means for driving the heater cartridge 410 by seventh cable 306. This embodiment of the present invention would work equally well if the heater cartridge 410 were combined with any of the previously described embodiments of heater 30.

Although the present invention has been described in considerable detail with reference to certain embodiments and preferred embodiments thereof, other alternative embodiments are possible. For example, the novel rehydration process applies to any compound, organic substance, or material amenable to rehydration at temperatures at about 100° C., the boiling point of water. Another possible application is a family size embodiment cooking apparatus the size of a conventional washing machine capable of feeding a family of ten to twenty people is contemplated. Another industrial size mobile cooking apparatus is contemplated of unlimited size and capacity that may use a gas heat furnace as a boiler, or equivalently, a fire fueled by wood or other materials. Therefore, the spirit and scope of the claims should not be limited to the description of any preferred embodiments, nor alternative embodiments, contained herein.

What is claimed is:

1. An apparatus for automatically cooking a dehydrated powdered product, comprising:
    a) a cooking container for receiving a specified amount of water and a specified amount of the product;
    b) a heater for heating said container, thereby to heat the water and cook the product;
    c) a dispenser to dispense the product into said container;
    d) a rotating paddle disposed within said container to mix the product with the water;
    e) a temperature sensor to sense the temperature of said container;
    f) a controller programmed to:
        1) control said heater to heat the water to a specified temperature;
        2) control said dispenser to dispense the product into said container after the water has reached the specified temperature;
        3) control said paddle to mix the product with the water; and
        4) control the temperature of the container during cooking;
    g) said container comprising a lid having an aperture for receiving the product into said container;
    h) said dispenser comprising a bin rotatably supported by said lid for rotation over said aperture; and
    i) said bin having a closed position and an open position with respect to said aperture, said bin having a ramp structured and arranged for gravity-force dispensing of the product through said aperture into said container when said bin is in said open position.

2. The apparatus of claim 1, wherein said container is maintained in heat transfer relation to said heater.

3. The apparatus of claim 1 and further comprising a fan controlled by said controller to cool the product to a desired temperature appropriate for human consumption.

4. The apparatus of claim 1, wherein:
    a) said container has a circular bowl shape with a side wall and a floor; and
    b) said paddle has at least one scraping edge portion for scraping the water and the product both vertically off said wall of said container and horizontally off said floor of said container simultaneously, said paddle further having at least one blade structured and arranged for folding and blending the water and the product.

5. The apparatus of claim 4 wherein said at least one blade is further structured and arranged at an angle to have an upward force when rotating in one direction of rotation and a downward force when rotating in an opposite direction of said one direction.

6. The apparatus of claim 1, wherein:
    a) said paddle has a vertical central member;
    b) first and second bottom blades attached opposite to each other to a bottom portion of said central member;
    c) first and second upper blades attached opposite to each other to an upper portion of said central member;
    d) said first and second bottom blades are angled with respect to a vertical plane at a first angle;
    e) said first and second upper blades are angled with respect to the vertical plane at a second angle complementary to said first angle, such that said first and second bottom blades tend to be lifted up while said first and second upper blades tend to be forced down by the product when rotating in one direction.

7. The apparatus of claim 6, wherein:
    a) said first bottom blade extends horizontally from said central member;
    b) said second bottom blade extends upwardly from said central member; and
    c) said first and second upper blades extend downward from said central member.

8. The apparatus of claim 7, and further comprising:
    a) a first connecting member joining said first lower blade and said first upper blade at their outer end portions; and b) a second connecting member joining said second lower blade and said second upper blade at their outer end portions.

9. The apparatus of claim 8, wherein:
a) said container includes a bottom wall and a vertical wall;
b) said first connecting member includes a first scraping edge engaging a portion of said vertical wall; and
c) said second connecting member includes a second scraping edge engaging another portion of said vertical wall; and
d) said first lower blade includes a third scraping edge engaging a portion of said bottom wall.

10. The apparatus of claim 1 and further comprising:
a) a water boiler controlled by said controller; and
b) said water boiler including an outlet to direct the heated water into said container.

11. The apparatus of claim 1, and further comprising:
a) a motor controlled by said controller;
b) a first shaft extending through a bottom portion of said container, said first shaft having a cross-bar secured to an end portion of said first shaft disposed outside said container;
b) a second shaft operably connected to said motor, said second shaft including a fork removably engaged with said cross-bar; and
c) said paddle is removably secured to said first shaft.

12. The apparatus of claim 7, wherein said motor is reversible thereby to selectively rotate said paddle clockwise and counterclockwise.

13. The apparatus of claim 1, wherein:
a) said dispenser includes a bin and a sector gear disposed along an outside wall of said bin;
b) a driving gear operably engaged with said sector gear to rotate said dispenser to said open position; and
c) a motor operably connected to said driving gear, said motor is controlled by said controller to activate said motor thereby to rotate said dispenser to said open position.

14. The apparatus of claim 1, wherein said heater is a microwave heater.

15. The apparatus of claim 1, wherein said heater is an induction heater.

16. The apparatus of claim 1, and further comprising:
a) a housing;
b) an arm hingedly secured to said housing;
c) said sensor is carried at a free end of said arm; and
d) a spring urging said arm against said container to thereby make said sensor contact said container.

17. The apparatus of claim 1, wherein said temperature sensor is a thermocouple.

18. The apparatus of claim 1, wherein said temperature sensor is a thermistor.

19. The apparatus of claim 1, wherein said controller is configured to:
a) heat the water to a temperature of about 900C to 1000C for cooking yam fufu;
b) rotate said paddle for several first cycles, each first cycle including clockwise rotation for several rotations and then counter-clockwise rotation for another several rotations while the product is being dispensed; and
c) rotate said paddle for several second cycles, each second cycle including clockwise rotation for several rotations, counter-clockwise rotation for another several rotations and no rotation for a period of time.

20. The apparatus of claim 19, and further comprising:
a) a fan operably associated with said container; and b) said controller is further configured to turn on said fan to reduce the temperature of said container to about 60° C. to 80° C.

21. The apparatus of claim 1, wherein said controller is configured to:
a) heat the water to a temperature of about 70° C. to 100° C. for cooking garri fufu;
b) rotate said paddle for several cycles, each cycle including clockwise rotation for several rotations and then counter-clockwise rotation for another several rotations while the product is being dispensed;
c) stop rotation of said paddle to allow the mixture to sit for a period of time; and
d) rotate said paddle for several more cycles for another period of time.

22. The apparatus of claim 21, and further comprising:
a) a fan operably associated with said container; and
b) said controller is further configured to operate said fan to reduce the temperature of said container to about 60° C. to 80° C.

23. The apparatus of claim 1, wherein said controller is programmable by a user.

24. An apparatus for automatically cooking a dehydrated powdered product, comprising:
a) a cooking container for receiving a specified amount of water and a specified amount of the product;
b) means for heating said container, thereby to heat the water and cook the product;
c) means for dispensing the product into said container;
d) a rotating paddle disposed within said container to mix the product with the water;
e) a temperature sensor to sense the temperature of said container; and
f) a controller programmed to:
 1) control said means for heating the water such that the water is heated to a specified temperature;
 2) control said means for dispensing the product such that the product is dispensed into said container after the water has reached the specified temperature;
 3) control said paddle to mix the product with the water; and
 4) control the temperature of the container during cooking.

25. The apparatus of claim 24, and further comprising means for cooling the product to a temperature appropriate for human consumption.

26. An apparatus for automatically cooking a dehydrated powdered product, comprising:
a) a cooking container for receiving a specified amount of water and a specified amount of the product;
b) a heater for heating said container, thereby to heat the water and cook the product;
c) a dispenser to dispense the product into said container;
d) a rotating paddle disposed within said container to mix the product with the water;
e) a temperature sensor to sense the temperature of said container;
f) a controller programmed to:
 1) control said heater to heat the water to a specified temperature;
 2) control said dispenser to dispense the product into said container after the water has reached the specified temperature;
 3) control said paddle to mix the product with the water; and
 4) control the temperature of the container during cooking;

g) said container has a circular bowl shape with a side wall and a floor; and h) said paddle has at least one scraping edge portion for scraping the water and the product both vertically off said wall of said container and horizontally off said floor of said container simultaneously, said paddle further having at least one blade structured and arranged for folding and blending the water and the product.

27. An apparatus for automatically cooking a dehydrated powdered product, comprising:
  a) a cooking container for receiving a specified amount of water and a specified amount of the product;
  b) a heater for heating said container, thereby to heat the water and cook the product;
  c) a dispenser to dispense the product into said container;
  d) a rotating paddle disposed within said container to mix the product with the water;
  e) a temperature sensor to sense the temperature of said container;
  f) a controller programmed to:
   1) control said heater to heat the water to a specified temperature;
   2) control said dispenser to dispense the product into said container after the water has reached the specified temperature;
   3) control said paddle to mix the product with the water; and
   4) control the temperature of the container during cooking;
  g) said paddle has a vertical central member;
  h) first and second bottom blades attached opposite to each other to a bottom portion of said central member;
  i) first and second upper blades attached opposite to each other to an upper portion of said central member;
  j) said first and second bottom blades are angled with respect to a vertical plane at a first angle; and
  k) said first and second upper blades are angled with respect to the vertical plane at a second angle complementary to said first angle, such that said first and second bottom blades tend to be lifted up while said first and second upper blades tend to be forced down by the product when rotating in one direction.

28. An apparatus for automatically cooking a dehydrated powdered product, comprising:
  a) a cooking container for receiving a specified amount of water and a specified amount of the product;
  b) a heater for heating said container, thereby to heat the water and cook the product;
  c) a dispenser to dispense the product into said container;
  d) a rotating paddle disposed within said container to mix the product with the water;
  e) a temperature sensor to sense the temperature of said container;
  f) a controller programmed to:
   1) control said heater to heat the water to a specified temperature;
   2) control said dispenser to dispense the product into said container after the water has reached the specified temperature;
   3) control said paddle to mix the product with the water; and
   4) control the temperature of the container during cooking;
  g) a motor controlled by said controller;
  h) a first shaft extending through a bottom portion of said container, said first shaft having a cross-bar secured to an end portion of said first shaft disposed outside said container;
  i) a second shaft operably connected to said motor, said second shaft including a fork removably engaged with said cross-bar; and
  j) said paddle is removably secured to said first shaft.

29. An apparatus for automatically cooking a dehydrated powdered product, comprising:
  a) a cooking container for receiving a specified amount of water and a specified amount of the product;
  b) a heater for heating said container, thereby to heat the water and cook the product;
  c) a dispenser to dispense the product into said container;
  d) a rotating paddle disposed within said container to mix the product with the water;
  e) a temperature sensor to sense the temperature of said container;
  f) a controller programmed to:
   1) control said heater to heat the water to a specified temperature;
   2) control said dispenser to dispense the product into said container after the water has reached the specified temperature;
   3) control said paddle to mix the product with the water; and
   4) control the temperature of the container during cooking;
  g) a housing;
  h) an arm hingedly secured to said housing;
  i) said sensor is carried at a free end of said arm; and
  j) a spring urging said arm against said container to thereby make said sensor contact said container.

* * * * *